(12) United States Patent
Arvanitakis et al.

(10) Patent No.: US 12,808,063 B2
(45) Date of Patent: Nov. 24, 2026

(54) REACTOR AND VAPORIZER SYSTEMS

(71) Applicant: TegIpco, LLC, Dover, DE (US)

(72) Inventors: Nicholas Joseph Wilson Arvanitakis, Cochise, AZ (US); Chrisanthos Arvanitakis, Cochise, AZ (US); Nick Martin, Cochise, AZ (US); Chad Collins, Cochise, AZ (US)

(73) Assignee: Teglpco, LLC, Dover, DE (US)

( * ) Notice: Subject to any disclaimer, the term of this patent is extended or adjusted under 35 U.S.C. 154(b) by 337 days.

(21) Appl. No.: 18/635,987

(22) Filed: Apr. 15, 2024

(65) Prior Publication Data

US 2024/0383746 A1 Nov. 21, 2024

Related U.S. Application Data

(60) Provisional application No. 63/548,963, filed on Feb. 2, 2024, provisional application No. 63/502,161, filed on May 15, 2023.

(51) Int. Cl.

| | |
|---|---|
| ***C25B 1/04*** | (2021.01) |
| ***C01B 3/0094*** | (2026.01) |
| ***C01B 3/02*** | (2026.01) |
| ***C01B 3/50*** | (2026.01) |
| ***C25B 15/08*** | (2006.01) |

(52) U.S. Cl.

CPC .............. *C25B 1/04* (2013.01); *C01B 3/0094* (2013.01); *C01B 3/02* (2013.01); *C01B 3/50* (2013.01); *C25B 15/083* (2021.01); *C25B 15/087* (2021.01); *B01J 2219/0809* (2013.01)

(58) Field of Classification Search

CPC ......... C01B 3/02; C01B 3/042; C01B 3/0094; C01B 3/50; C25B 1/04; B01J 2219/0809

USPC .................................................... 252/188.25

See application file for complete search history.

(56) References Cited

U.S. PATENT DOCUMENTS

| | | | |
|---|---|---|---|
| 4,021,321 | A | 5/1977 | White |
| 4,077,788 | A | 3/1978 | Woollam |
| 5,268,079 | A | 12/1993 | Ochoa Gomez et al. |
| 5,387,725 | A | 2/1995 | Walters et al. |

(Continued)

FOREIGN PATENT DOCUMENTS

| | | |
|---|---|---|
| CN | 107913653 | 4/2018 |
| CN | 110870119 | 3/2020 |

(Continued)

OTHER PUBLICATIONS

Sambalova "Magnetic field enhancement of electrochemical hydrogen evolution reaction probed by magneto-optics." International Journal of Hydrogen Energy vol. 46, Issue 5, Jan. 19, 2021, pp. 3346-3353 (Year: 2021).*

(Continued)

*Primary Examiner* — Tri V Nguyen

(74) *Attorney, Agent, or Firm* — Chris Tanner; FYPA.legal

(57) ABSTRACT

A system and method for converting a common hydrogen-based input fluid into an output fluid comprising an over-abundance of hydrogen $H_1$ atoms is disclosed. This conversion occurs in the absence of elevated temperatures or pressures, so that the resulting output fluid is suitable for shipping or storage at Standard Temperature and Pressure (STP). A vaporizer system and method for transforming the output fluid into H2 gas is also disclosed.

11 Claims, 21 Drawing Sheets

(56) References Cited

U.S. PATENT DOCUMENTS 5,520,793 A 5/1996 Genders et al.
5,569,443 A 10/1996 Wilson et al.
5,679,133 A 10/1997 Moll et al.
5,837,032 A 11/1998 Moll et al.
5,919,442 A 7/1999 Yin et al.
6,106,853 A 8/2000 Cox et al.
6,171,551 B1 1/2001 Malchesky et al.
6,468,499 B1 10/2002 Balachandran
6,903,173 B2 6/2005 Cernohous et al.
7,513,987 B1 4/2009 Wurzbarger
8,540,962 B2 9/2013 Kodama
9,499,422 B1 11/2016 Carson et al.
9,636,358 B2 5/2017 Satoh
9,657,248 B1 5/2017 Cox, Jr.
9,702,049 B1 7/2017 Parker et al.
10,113,122 B2 10/2018 Zheng
10,131,558 B1 11/2018 Cox, Jr. et al.
10,174,260 B2 1/2019 Iversen
10,214,820 B2 2/2019 Koeneman
10,316,007 B2 6/2019 Teles et al.
10,322,932 B2 6/2019 Gu
10,586,993 B2 3/2020 Cheng
10,618,057 B2 4/2020 Carlson
11,066,617 B2 7/2021 Reid et al.
11,680,746 B2 6/2023 Allidieres
11,725,290 B2 8/2023 Reed et al.
11,735,751 B1 8/2023 Wang et al.
11,761,097 B2 9/2023 Ballantine
11,761,103 B2 9/2023 Joos
11,767,599 B2 9/2023 Ballantine
11,767,600 B2 9/2023 Dawson
11,926,910 B2 3/2024 Soerensen
11,953,157 B2 4/2024 Allidieres
12,103,849 B2 10/2024 Lugtigheid
12,117,239 B2 10/2024 Takase
2001/0007045 A1 7/2001 Beckman et al.
2001/0038087 A1 11/2001 Santilli
2002/0155177 A1 10/2002 Krasutsky et al.
2004/0024130 A1 2/2004 Nelson et al.
2007/0066791 A1 3/2007 Jernigan et al.
2007/0080070 A1* 4/2007 Klein ........................ H01F 1/00 205/628
2007/0199485 A1 8/2007 Capote et al.
2008/0047901 A1 2/2008 Golden et al.
2008/0246173 A1 10/2008 Braidwood et al.
2008/0293102 A1 11/2008 Oxender et al.
2008/0311640 A1 12/2008 Cox et al.
2009/0074611 A1 3/2009 Monzyk et al.
2009/0297429 A1 12/2009 Vohra et al.
2009/0311559 A1 12/2009 Levine et al.
2010/0087687 A1 4/2010 Medoff
2010/0108567 A1 5/2010 Medoff
2010/0135865 A1 6/2010 Constantz et al.
2010/0219373 A1 9/2010 Seeker et al.
2010/0230830 A1 9/2010 Farsad et al.
2010/0287822 A1 11/2010 Wei et al.
2010/0305297 A1 12/2010 Hoshino et al.
2010/0311167 A1 12/2010 Wood et al.
2011/0017209 A1 1/2011 Monzyk
2011/0046422 A1 2/2011 Mcauliffe et al.
2011/0111456 A1 5/2011 Medoff
2011/0120879 A1 5/2011 Buschmann
2011/0245527 A1 10/2011 Ooms et al.
2011/0286913 A1 11/2011 Lugtigheid
2011/0308962 A1 12/2011 Eckelberry et al.
2012/0021303 A1 1/2012 Amendola et al.
2012/0021469 A1 1/2012 Gooding et al.
2012/0035376 A1 2/2012 Mullen et al.
2012/0058405 A1 3/2012 Kirchoff et al.
2012/0097550 A1* 4/2012 Lockhart ................. C01B 3/042 205/628
2012/0103909 A1 5/2012 Burba et al.
2012/0122017 A1 5/2012 Mills
2012/0151827 A1 6/2012 Powell et al.
2012/0276222 A1 11/2012 Harvey et al.
2013/0084474 A1 4/2013 Mills
2013/0344367 A1 12/2013 Chiang et al.
2014/0000153 A1 1/2014 Powell
2014/0000154 A1 1/2014 Powell
2014/0031599 A1 1/2014 Komplin et al.
2014/0065020 A1* 3/2014 Edlund ..................... C01B 3/32 422/114
2014/0072836 A1 3/2014 Mills
2014/0088330 A1 3/2014 Powell et al.
2014/0096764 A1 4/2014 Komplin et al.
2014/0109464 A1 4/2014 Powell et al.
2014/0131217 A1 5/2014 Buschmann
2014/0147907 A1 5/2014 Medoff et al.
2014/0154749 A1 6/2014 Medoff
2014/0209479 A1 7/2014 Hoffmann et al.
2014/0255565 A1 9/2014 Harvey et al.
2014/0317999 A1 10/2014 Weerasooriya et al.
2014/0323369 A1 10/2014 Weerasooriya et al.
2014/0356744 A1 12/2014 McAlister
2015/0010833 A1 1/2015 Amendola et al.
2015/0087031 A1 3/2015 Jansen et al.
2015/0171455 A1 6/2015 Mills
2015/0218599 A1 8/2015 Angenent et al.
2015/0238503 A1 8/2015 Maillet et al.
2016/0024399 A1 1/2016 Gargano et al.
2016/0045841 A1 2/2016 Kaplan et al.
2016/0082387 A1 3/2016 Constantz et al.
2016/0115140 A1 4/2016 Teles et al.
2016/0121298 A1 5/2016 Constantz et al.
2016/0126562 A1 5/2016 Pivovar et al.
2016/0201197 A1 7/2016 Monzyk et al.
2016/0207801 A1 7/2016 Stronczek
2016/0290223 A1* 10/2016 Mills ......................... C01B 3/00
2017/0070180 A1 3/2017 Mills
2017/0104426 A1 4/2017 Mills
2017/0281670 A1 10/2017 Hoover
2017/0368556 A1 12/2017 Carlson
2018/0104644 A1 4/2018 Cox, Jr.
2018/0159459 A1 6/2018 Mills
2019/0051917 A1 2/2019 Kitao
2019/0186022 A1 6/2019 Plaisted et al.
2019/0192558 A1 6/2019 Richards et al.
2019/0372449 A1 12/2019 Mills
2019/0390158 A1 12/2019 Dyson et al.
2020/0002828 A1 1/2020 Mills
2020/0024759 A1 1/2020 Booth et al.
2020/0056291 A1 2/2020 Murray et al.
2020/0056298 A1 2/2020 Voskian et al.
2020/0068885 A1 3/2020 Dhawan et al.
2020/0071619 A1 3/2020 Humphreys et al.
2020/0121715 A1 4/2020 Bishop et al.
2020/0156039 A1 5/2020 Medoff et al.
2020/0157696 A1 5/2020 Cardarelli
2020/0290034 A1 9/2020 Carlson et al.
2020/0290895 A1 9/2020 Mosher et al.
2020/0332423 A1 10/2020 Dhawan et al.
2020/0339704 A1 10/2020 Bradner et al.
2020/0352980 A1 11/2020 Mahowald et al.
2020/0354481 A1 11/2020 Geremia et al.
2020/0366180 A1 11/2020 Mills
2020/0391876 A1 12/2020 Morrison
2020/0392025 A1 12/2020 Kadota et al.
2020/0398992 A1 12/2020 Morrison
2020/0399147 A1 12/2020 Yost et al.
2020/0403555 A1 12/2020 Mills
2021/0079131 A1 3/2021 Laskowski et al.
2021/0169053 A1 6/2021 Timmons
2021/0310134 A1* 10/2021 Silva ....................... F02G 1/053
2022/0009897 A1 1/2022 Guo et al.
2022/0021290 A1 1/2022 Mills
2022/0052361 A1 2/2022 Morrison et al.
2022/0106060 A1 4/2022 Morrison et al.
2022/0118423 A1 4/2022 Simonyan et al.
2022/0125074 A1 4/2022 Canet-Martinez et al.
2022/0152572 A1 5/2022 Fernandez Prieto et al.
2022/0152573 A1 5/2022 Fernandez Prieto et al.
2022/0161219 A1 5/2022 Fernandez Prieto et al.
2022/0166041 A1* 5/2022 Mitsuta ..................... C25B 1/02
2022/0169762 A1 6/2022 Askar et al.

(56) References Cited

U.S. PATENT DOCUMENTS

| | | | |
|---|---|---|---|
| 2022/0170386 | A1 | 6/2022 | O'Donnell et al. |
| 2022/0175719 | A1 | 6/2022 | Cave et al. |
| 2022/0243871 | A1 | 8/2022 | Adkins |
| 2022/0275521 | A1 | 9/2022 | Albrecht et al. |
| 2022/0275522 | A1 | 9/2022 | Self et al. |
| 2022/0275524 | A1 | 9/2022 | Hoe et al. |
| 2022/0289379 | A1 | 9/2022 | Morrison |
| 2022/0315223 | A1 | 10/2022 | Morrison |
| 2022/0320544 | A1 | 10/2022 | Papasavva et al. |
| 2022/0348468 | A1 | 11/2022 | Iakimov |
| 2022/0380682 | A1 | 12/2022 | Daley et al. |
| 2022/0380919 | A1 | 12/2022 | Pham et al. |
| 2023/0062648 | A1 | 3/2023 | Arevalo |
| 2023/0101593 | A1 | 3/2023 | Albrecht et al. |
| 2023/0143022 | A1 | 5/2023 | Mills |
| 2023/0150030 | A1 | 5/2023 | Brown et al. |
| 2023/0183465 | A1 | 6/2023 | Kawasaki et al. |
| 2023/0202652 | A1 | 6/2023 | Convert |
| 2023/0323839 | A1 | 10/2023 | Oorebeek et al. |
| 2023/0341180 | A1 | 10/2023 | Huang |
| 2023/0348091 | A1 | 11/2023 | Kawai et al. |
| 2023/0406526 | A1 | 12/2023 | Vassberg |
| 2024/0017250 | A1 | 1/2024 | Nydacker et al. |
| 2024/0018008 | A1 | 1/2024 | Snydacker et al. |
| 2024/0024823 | A1 | 1/2024 | Lucas et al. |
| 2024/0026138 | A1 | 1/2024 | Kawasaki et al. |
| 2024/0034856 | A1 | 2/2024 | Kawasaki |
| 2024/0034871 | A1 | 2/2024 | Kawasaki et al. |
| 2024/0052072 | A1 | 2/2024 | Kawasaki et al. |
| 2024/0079988 | A1 | 3/2024 | Mills |
| 2024/0124305 | A1 | 4/2024 | Onaizi |
| 2024/0124700 | A1 | 4/2024 | Kawasaki et al. |
| 2024/0194922 | A1 | 6/2024 | Groberg et al. |
| 2024/0199778 | A1 | 6/2024 | Kawasaki et al. |
| 2024/0217817 | A1 | 7/2024 | Mennell et al. |
| 2024/0254398 | A1 | 8/2024 | Reed et al. |
| 2024/0286944 | A1 | 8/2024 | Ghosh et al. |
| 2024/0327609 | A1 | 10/2024 | Kawasaki |

FOREIGN PATENT DOCUMENTS

| | | |
|---|---|---|
| CN | 114411200 | 4/2022 |
| EP | 0389263 | 9/1990 |

OTHER PUBLICATIONS

Hodges "A high-performance capillary-fed electrolysis cell promises more cost-competitive renewable hydrogen." Nature Communications vol. 13, Article No. 1304. (Year: 2022).*

Jia "Design of a compact, permanent magnet electron cyclotron resonance ion source for proton and H2+ beam production." Review of Scientific Instruments 81, 02A321 (Year: 2010).*

PCT/US2024/056314, International Search Report (ISR) mailed Apr. 25, 2025.

PCT/US2024/056314, Written Opinion (ISR) mailed Apr. 25, 2025.

Murray-Smith, Robert; YouTube video "Generating Hydrogen Using Magnetics" https://www.youtube.com/watch?v=N5LYT38Ex94 ; published within YouTube on May 15, 2020 including numerous written comments.

* cited by examiner (non-"domino" style magnet)

FIG. 5A (magnets 508 taped on)

(foreshortened)

(magnets 508 hidden from view by the tape forming the ring 512)

(skeletal-partial view)

REACTOR AND VAPORIZER SYSTEMS

FIELD OF THE INVENTION

The embodiments herein relate to fuel production, storage, and transport through the concentration and extraction of hydrogen derived from common hydrogen-bearing liquids.

BACKGROUND OF THE INVENTION

There exist a variety of different processes to make hydrogen, many of which are the subject of significant research and development efforts. Some of the processes disclosed include biomass pyrolysis or gasification and biological processes, such as bacterial fermentation and enzymatic hydrogen production. Electrolysis is another technology for making hydrogen in which water is decomposed into oxygen and hydrogen. Currently, however, hydrogen is produced commercially from fossil methane. Such production processes are inexpensive and the natural gas feedstock for the process is widely available and relatively low cost.

U.S. Pat. No. 4,077,788 (Woollam) discloses an atomic hydrogen storage method and device in which atomic hydrogen is stored in the presence of a strong magnetic field in exfoliated layered compounds such as molybdenum disulfide or an elemental layer material such as graphite. The compound is maintained at liquid helium temperatures and the atomic hydrogen is collected on the surfaces of the layered compound which are exposed during delamination (exfoliation). The '788 Woollam disclosure suggests that strong magnetic field and the low temperature combine to prevent the atoms of hydrogen from recombining to form molecules.

The '788 Woollam implementation, and numerous other attempts to isolate hydrogen, suffer from numerous impediments and inefficiencies that make them sub-optimal for capture and transport of hydrogen in a usable non-dangerous form. Consequently, an improved system for capturing hydrogen is desired.

SUMMARY OF THE INVENTION

The embodiments herein are directed to creation of a stable, solubilized output fluid bearing atomic hydrogen at standard temperatures and pressures for use in power, storage and transportation. A wide variety of common input liquids may be used as feedstock for the system and method so long as they are rich in constituent hydrogen. The processes require application of low cost electrostatic and magnetostatic forces that aid in increasing a saturation of protons predominantly atomic hydrogen and a decrease of overall electric charge throughout the fluid. No catalysts or imposed change to the state of the starting fluid is required during the process of the invention.

Advantageously, a saturation of protons will be obtained and a deficiency of electrons by batch or continuous process flow that may be measured and verified experimentally by specific gravity, pH, resistivity and conductivity, thus insuring that an output liquid product is proton rich and electron depleted. In one embodiment, a system, apparatus, and method for concentrating hydrogen in a liquid is disclosed.

A method for driving an overabundance of hydrogen in a liquid is provided in which a liquid is placed in a static electric field having a first polarity. The liquid is then moved through a static magnetic field having a first polarity, through a static electric field having a second polarity, through a static magnetic field having a second polarity, and then through an oscillating magnetic field.

BRIEF DESCRIPTION OF DRAWINGS

The various embodiments of the inventive subject matter of the present disclosure will be described in more detail in conjunction with the following drawing figures. The structures in the drawing figures are illustrated schematically, and they are not necessarily drawn to scale. The drawings figures are not intended to show actual dimensions.

FIGS. 4, 5A-5B, and 6A-6B show example recirculators;

DETAILED DESCRIPTION OF THE PREFERRED EMBODIMENTS

Figure 1A:
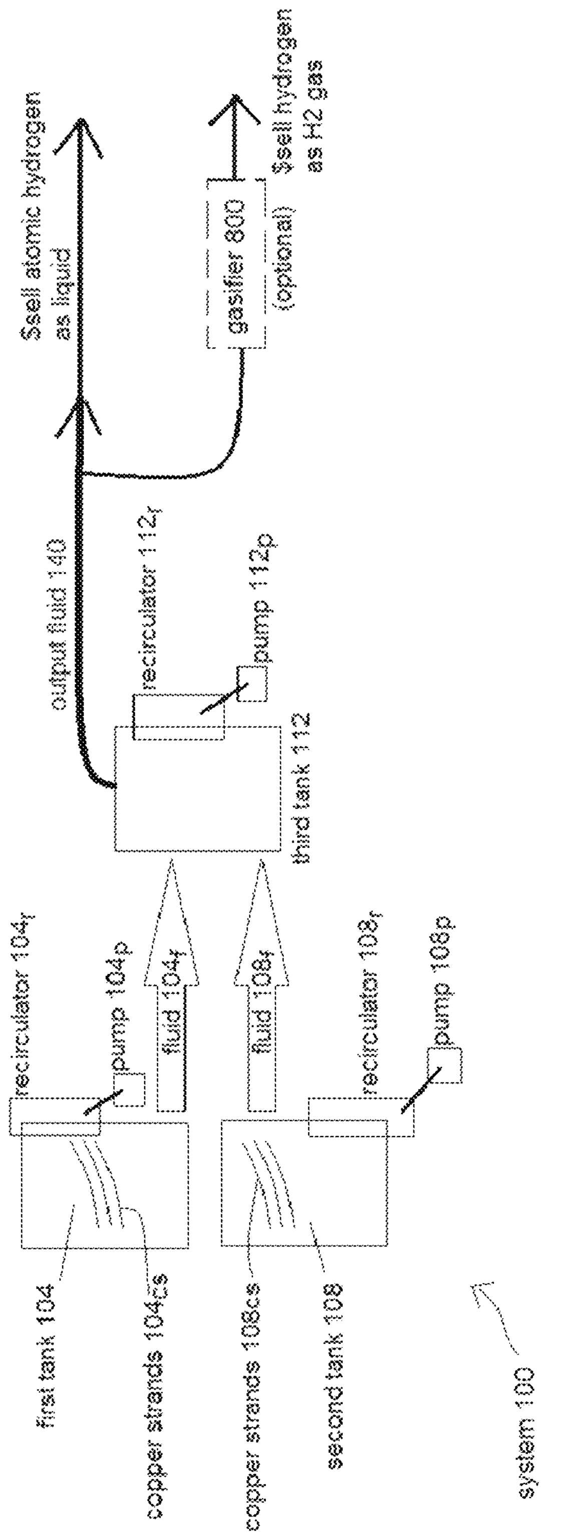
FIGS. 1A and 1B show a reactor system according to the embodiments herein.

FIG. 1A shows an example system 100 for producing a proton-rich output fluid 140. The system 100 converts a common hydrogen-based input fluid 101 to an output fluid 140 comprising an overabundance of hydrogen $H_1$ atoms, mainly just protons since atomic hydrogen does not have a neutron. This conversion occurs in the absence of elevated temperatures or pressures, so that the resulting output fluid 140 is suitable for shipping or storage at Standard Temperature and Pressure (STP, or Normal Temperature and Pressure NTP). One example period of reliable shelf-life of the output fluid 140 might be 36 months, although there could be examples of even longer shelf-life, depending on the specific formulation.

The input fluid 101 may be one of various commonly-found hydrogen-donating fluids or mixes of multiple hydrogen-donating fluids, and can also be dirty water, fracked water, and/or processed water. A non-limiting list of potential types of hydrogen-donating fluids can be found in an Appendix A to this disclosure, titled "EXAMPLE HYDROGEN-DONATING FLUIDS".

Figure 1B:
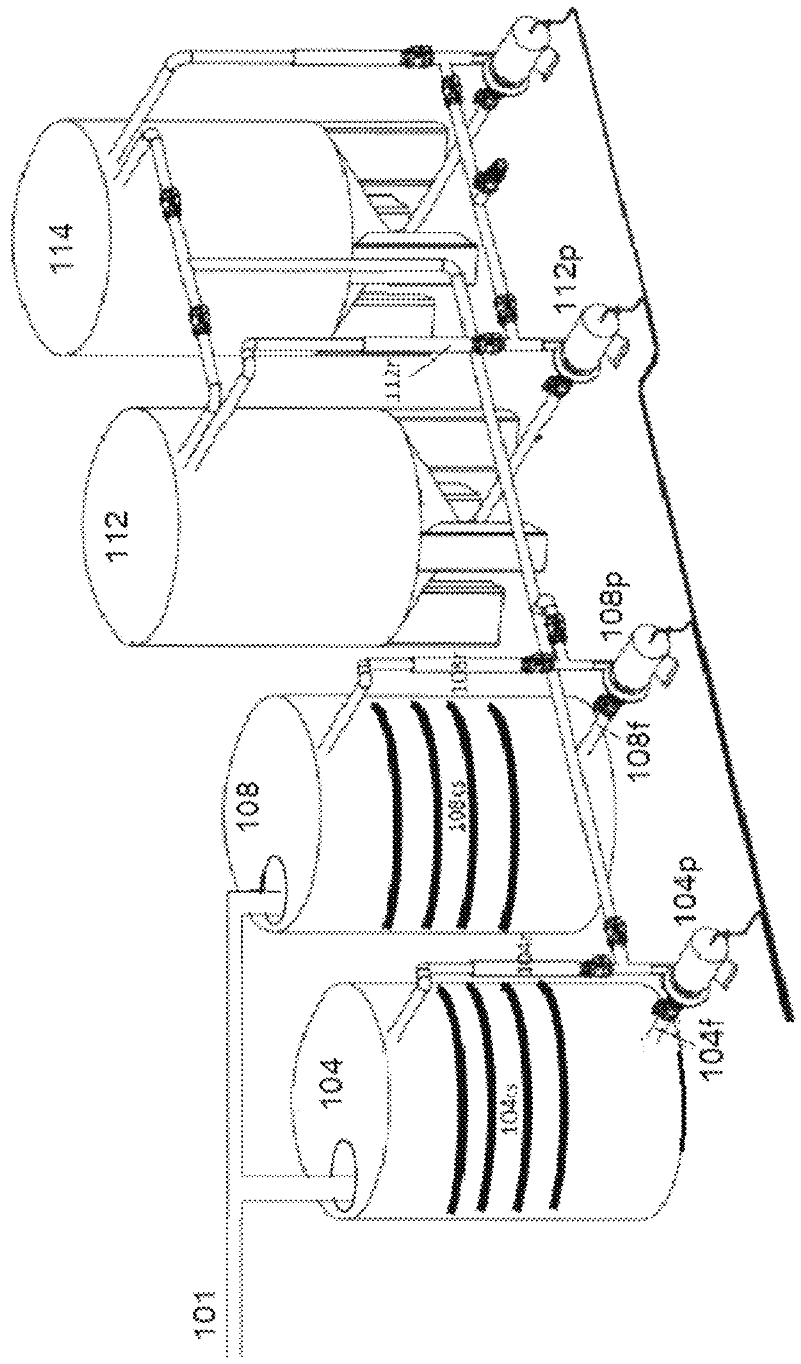

Referring to FIGS. 1A and 1B, the system 100 includes a first tank 104, a second tank 108, a third tank 112, and corresponding recirculators 104*r*, 108*r*, 112*r*. Both first and second tanks 104108 comprise recirculator 104*r*108*r*, pump 104*p*108*p*, and copper strands 104*cs*108*cs*. Both first and second tanks also pump out fluid 104*f*108*f* that has been processed and is on its way to becoming the proton rich atomic hydrogen output fluid 140. FIG. 1B shows a fourth tank 114 which acts as a potential overflow tank, or storage tank, or other way of assisting in management of output fluid 140 during or after a production run of thereof.

In some embodiments the tanks 104\108\112\114 may be formed from a poly material having a standard wall strength of 19 lb. The tanks 104\108 have the circumferential windings 104*cs*108*cs* applied to their outer surface thereby forming a reaction zone. The windings 104*cs*108*cs* can be formed with a 14-12 gauge copper stranded wire that is wrapped onto outer surface of the tank 104\108 and may be spaced away from the bottom, about e.g. 12 inches with a 2 inch spacing ending about e.g. 8 inches below the top.

The pumps 104*p*108*p* can be threaded to receive a ball valve, e.g., Schedule 40 or 80, and can be liquid impeller pumps. Regardless of which type of pump, the pumps 104*p*108*p* are coupled to the recirculators 104*r*108*r* which have magnet-packs 508 in various orientations attached thereto. The circumferential windings 104*cs*108*cs* may be electrically coupled to a power supply 135 so as to be electrically coupled to either alternating or direct current.

A pre-determined wattage for the circumferential windings 104*cs* 108*cs* is selected based on the chemical constituents of the input fluid 101, a desired configuration of the output fluid 140, or other factor. As current moves through windings 104*cs*108*cs*, a corresponding magnetic field directed perpendicularly to windings 104*cs*108*cs* applies a magnetostatic force to liquid 101 while being recirculated through the tanks 104\108 for a predetermined period of time until the outlet fluid 104*f*108*f* is transferred via e.g. the ball valves to the tank 112.

The magnetostatic forces applied to the windings 104*cs*108*cs* can be adjusted between 2,000-80,000 Gauss, with 20,000-80,000 Gauss being a preferred range. Once a magnetic field setting is reached and a processing cycle has begun, it's typical to make no further adjustments. This is helpful not only for ensuring a steady magnetic field and magnetostatic force being applied to the input fluid 101, but also for optimal experimentation, accurate measurements.

When outlet openings 104*f* and 108*f* are opened, the fluids 104*f*108*f* are combined into the third tank 112 which comprises a recirculator 112*r* and pump 112*p*. The tank 112 may be formed from a poly tank having a wall strength of e.g. 19 lb. Once the fluid from both first tank 104 and second tank 108 are combined into the third tank 112, the combination is pumped and recirculated within the third tank 112.

Unlike the first tank 104 or second tank 108, third tank 112 does not have a circumferential windings or copper strands, and therefore experiences no electrostatic effects. Instead, the third tank 112 experiences an oscillating magnetic field through the recirculator 112*r* due to the magnet-packs 508 attached thereto.

Figure 7A:
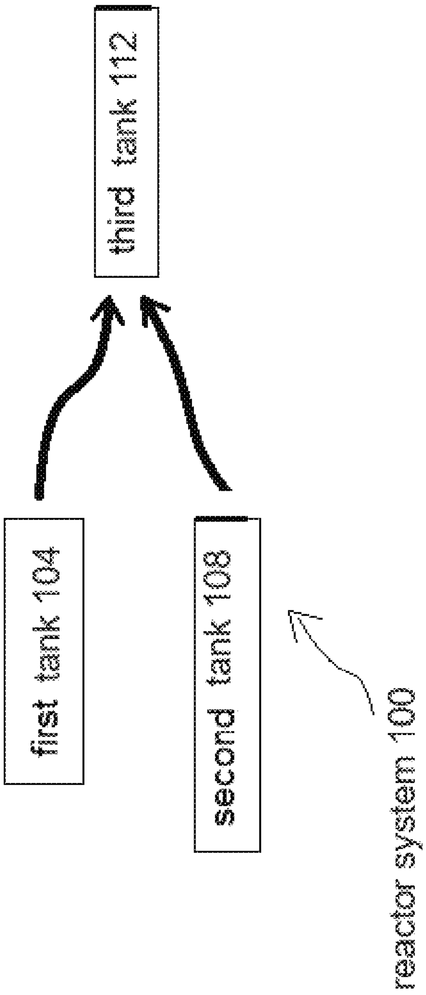
FIGS. 7A-7B show contrasting embodiments of reactor systems.
Figure 7B:
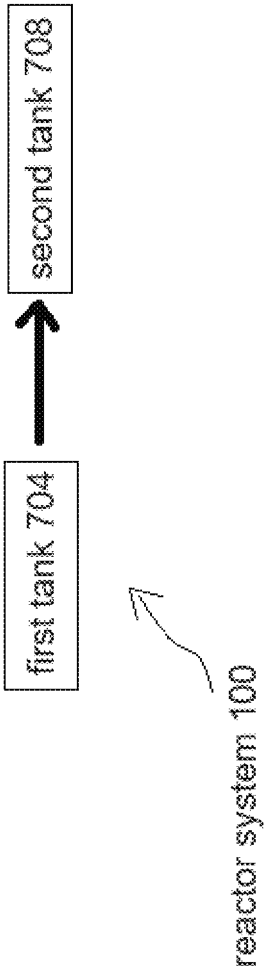

Potential alternate embodiments can include a 2-tank system 700 rather than 3-tank system 100, as shown in the contrasting arrangements of FIG. 7A and FIG. 7B. Further, the recirculators 104*r*108*r*112*r* can have windings or electrical components located directly therein. For brevity and clarity, such windings or electrical components are not shown in any Figures.

Figure 2:
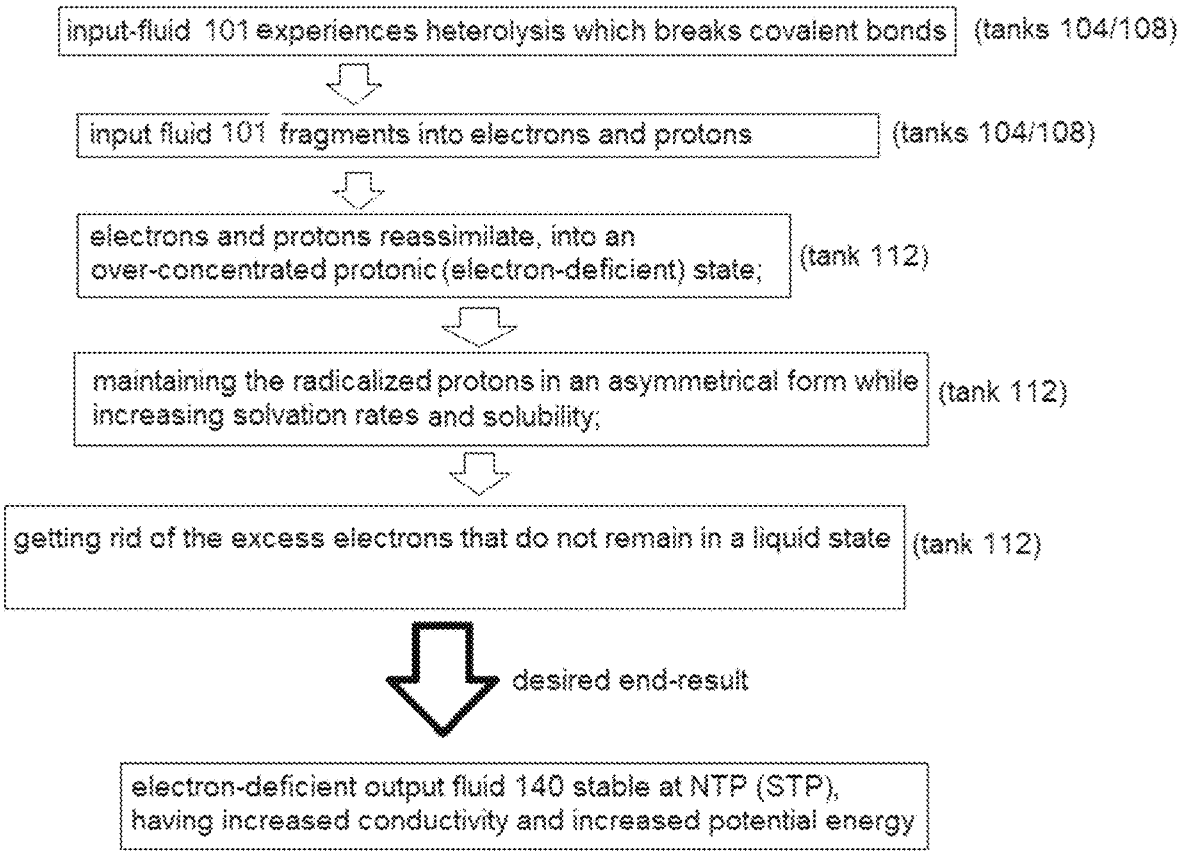
FIGS. 2 and 3 show example methods of operation of the reactor systems of FIGS. 1A and 1B.
Figure 3:
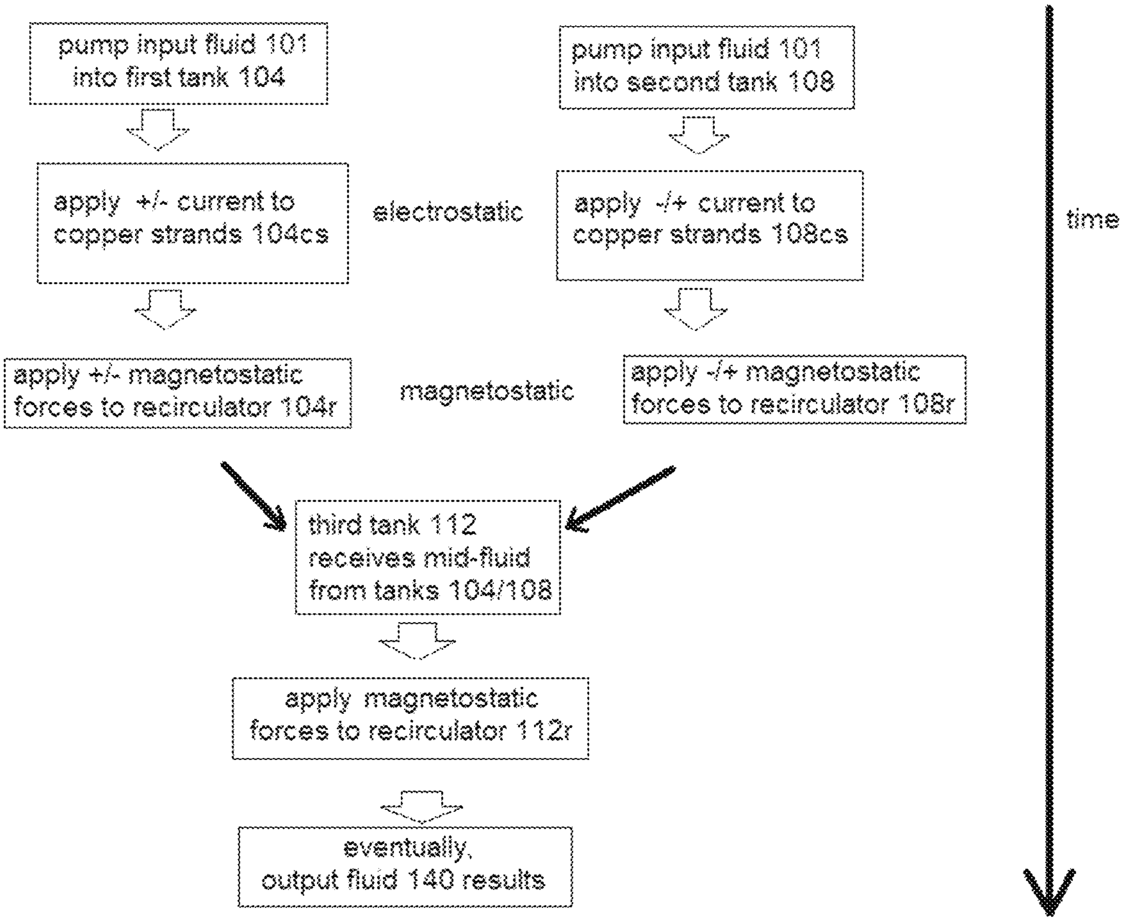
Figure 4:
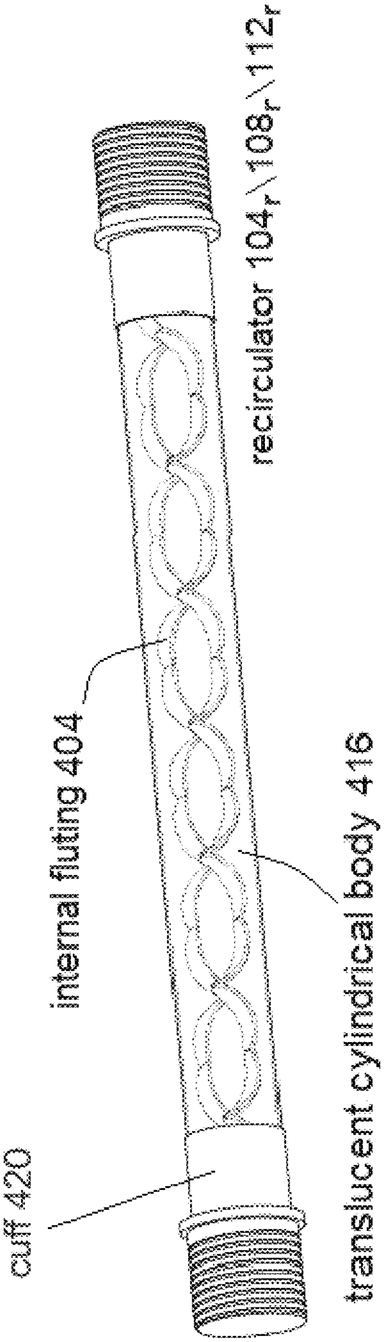

FIG. 2 is a flowchart of an overview of the various reactions that take place in the system 100. FIG. 3 is a flowchart of a step-by-step recitation of what happens at each stop along the way through the reactor system 100, including what happens in which of the three tanks 104\108\112. The flowcharts in FIGS. 2 and 3 address the same base reactor-process, but convey differing facts in different ways.

FIGS. 4, 5A, 5B, 6A, and 6B show detail of the recirculators 104*r*, 108*r*, and 112*r*, which are sometimes referred to as static mixers. As shown at least within FIG. 4, each recirculator can be formed as an elongated translucent tube 416 that has internal fluting 404 (AKA baffle) located therein. The recirculators 104*r*, 108*r*, and 112*r* further comprise a cuff 420 at each end, along with threaded surfaces so that they may be connected in series. The internal fluting 404 aids in restraining fluid flowing through the translucent tube 416 thereby forming a type of reaction zone. Each internal fluting 404 is often formed as a plurality of cuffs 420 that can be concatenated to one another so as to form a chain structure.

Moving to FIG. 5A, within any particular recirculator, a plurality of magnets or magnet packs 508 are arranged circumferentially about the outer surface of the tube 416 and periodically located its length. In some embodiments, each magnet pack 508 is formed with one or more static bar-magnets 508 that define opposite polarities often denoted as a North and South.

Figure 5B:
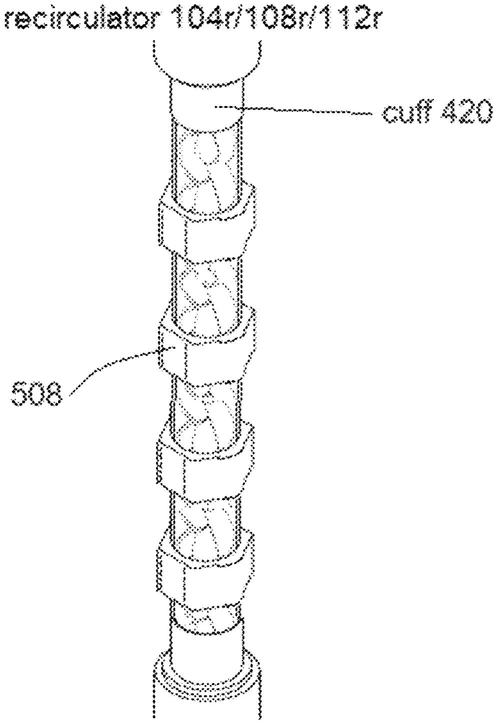
Figure 5B:
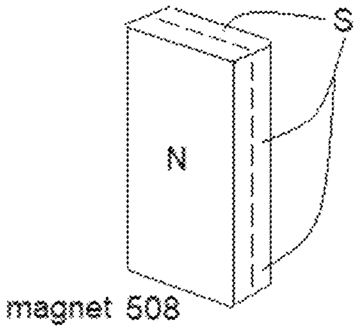
Figure 6B:
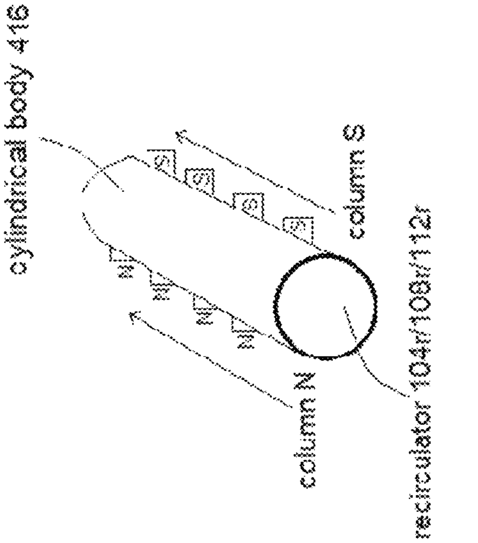
Figure 6A:
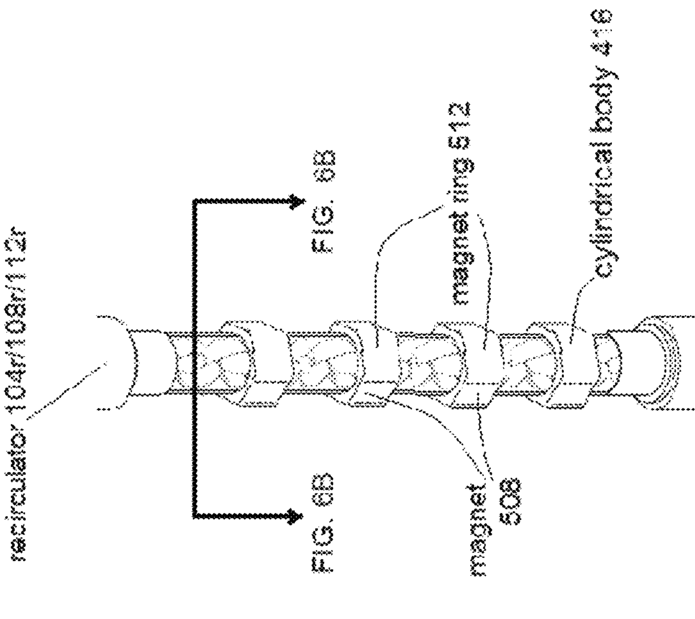

Each magnet 508 is arranged on an outer surface of the tube 416 in specific ways. One example arrangement is where each North pole side may be facing e.g. radially inwardly, toward the center of tube 416. In this arrangement, each South pole side of a magnet or magnet group 508 would then face radially outwardly from an outer surface of the tube 416. The specific size, shape, and orientation of the individual magnets 508 can vary. FIG. 5B shows an example magnet 508 having a non-domino shape, but that is for example only.

As shown in FIG. 5A, an embodiment of the recirculators 104*r*108*r*112*r* may be forty-eight inches in length with a plurality of circumferentially taped magnets or magnet groups 508 positioned on outer surface beginning from about three inches from a first end of the tube 416 so as to be periodically located along the length of tube 416 to within six inches from a second end of the tube 416. A plurality of circumferentially wrapped magnetic packs 416 will provide a magnetostatic force that is applied to the input fluid 101, as discussed with regard to FIG. 3.

During use, a magnetic field is applied to the tanks 104*t*108*t*. This magnetic field is often in the range of 2K-180K Gauss.

As shown in FIG. 2, in operation, input fluid 101 is piped into tanks 104\108 until at least partially filled. The tanks 104\108 will have a predetermined wattages applied through their respective circumferential winding 104*cs*108*cs* for predetermined time periods, often at least 45 minutes. Often, current applied through the circumferential windings 104*cs*108*cs* may be between 5-100 amps at a wattage between 60-1200 watts, with 100 amps at 1,000 watts being advantageous. The polarity of the current source supplying circumferential windings 104*cs*108*cs* can be equal.

During use, the recirculating pumps 104*p*108*p* move the input fluid 101 through the tanks 104\108 via the recirculators 104*r*108*r* which apply a uniform static magnetic field to input liquid 101 via the magnets 508.

A polarity applied to input liquid 101 through recirculator 104*r* may be opposite the polarity applied recirculator 108*r*. In one embodiment, recirculator 104*r* will be set with North pole sides 193 facing radially inwardly applying a total of 46,000 Gauss to input liquid 101, while the recirculator 108*r* will be set with South pole sides facing radially inwardly thereby applying a total of 46,000-58,000 Gauss to the input liquid 101.

Continuing this example, constant recirculation of the input fluid 101 from the tanks 104\108 through recirculators 104*r*108*r* causes a non-transitory polar imbalance in the input liquid 101. The differences in fluid velocities within recirculators 104*r*108*r* thus creates a separation and segregation of atomic hydrogen within the input fluid 101.

The reactor system(s) 100 can be operated with a variety of ranges and thus have a lot of configurability and ability to be customized for specific types of production runs of the output fluid 140, and also can be adapted to specific types of input fluid 101. As stated, typically, the input fluid will be a hydrogen-donating fluid. Further, each of the first, second, and third recirculators can separately apply a pre-configured magnetic field to the fluid circulating therein, therefore creating a separate proton-rich vortex within each of the plurality of tanks 104\108\112. These pre-configured magnetic fields can be adjusted by changing and varying the magnet packs 508 attached to the recirculators.

The activity within the reactor system(s) 100 result in removing electrons from the input fluid in such a way that the resulting output fluid becomes electron-deficient. This output fluid 140 can remain electron deficient at STP for varying periods, in many configurations have a shelf-life of 36 months.

The circumferential windings 104*cs*108*cs* can have a variety of voltages and currents applied thereto. The voltage applied to the windings 104*cs* may be equal to that applied to the windings 108*cs*, or may not. Further, a voltage may be applied to one set of windings but not the other, and polarity may be altered.

This ends the main discussion of the reactor system(s) 100, and the vaporizer 800 will now be discussed.

Figure 8A:
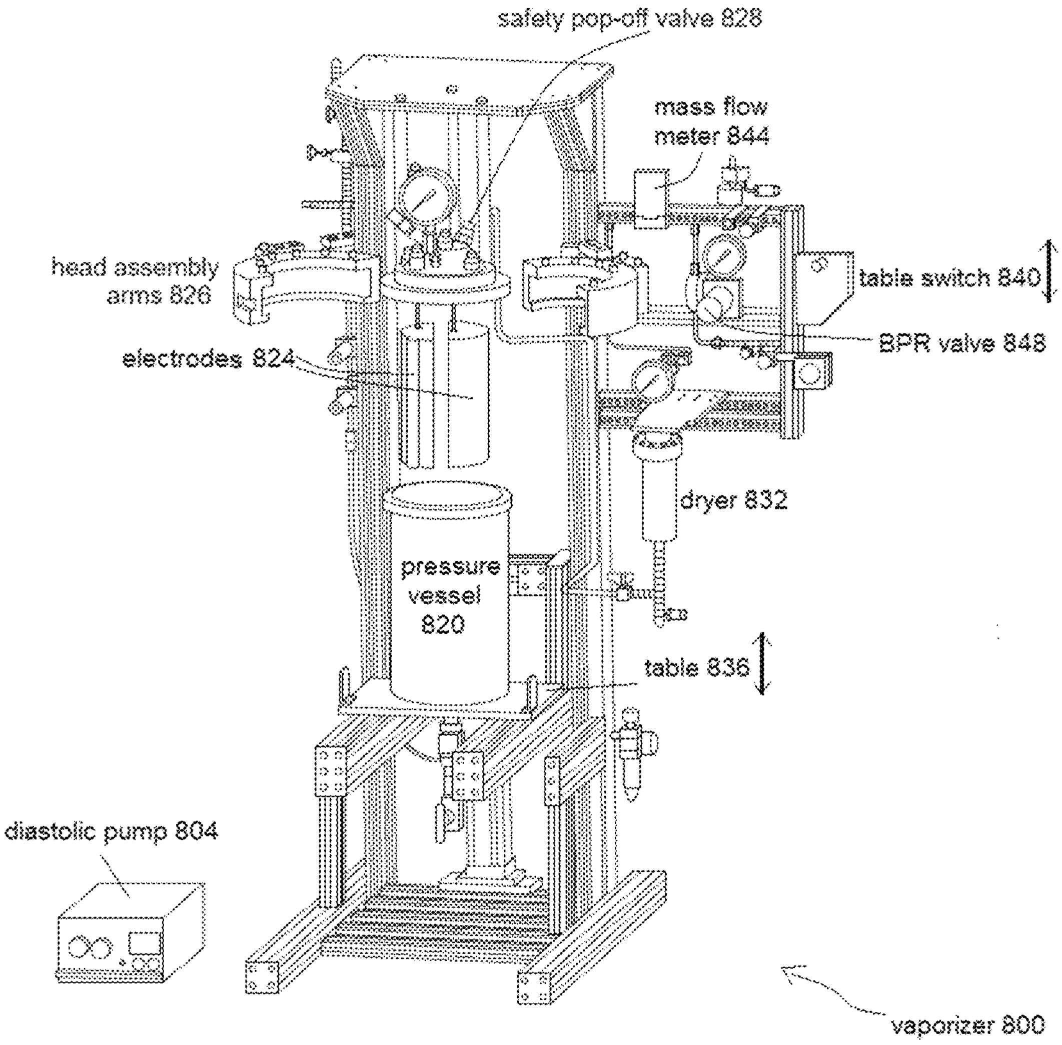
FIGS. 8A-8B and 8D-8E show various details of an embodiment of a vaporizer.
Figure 8B:
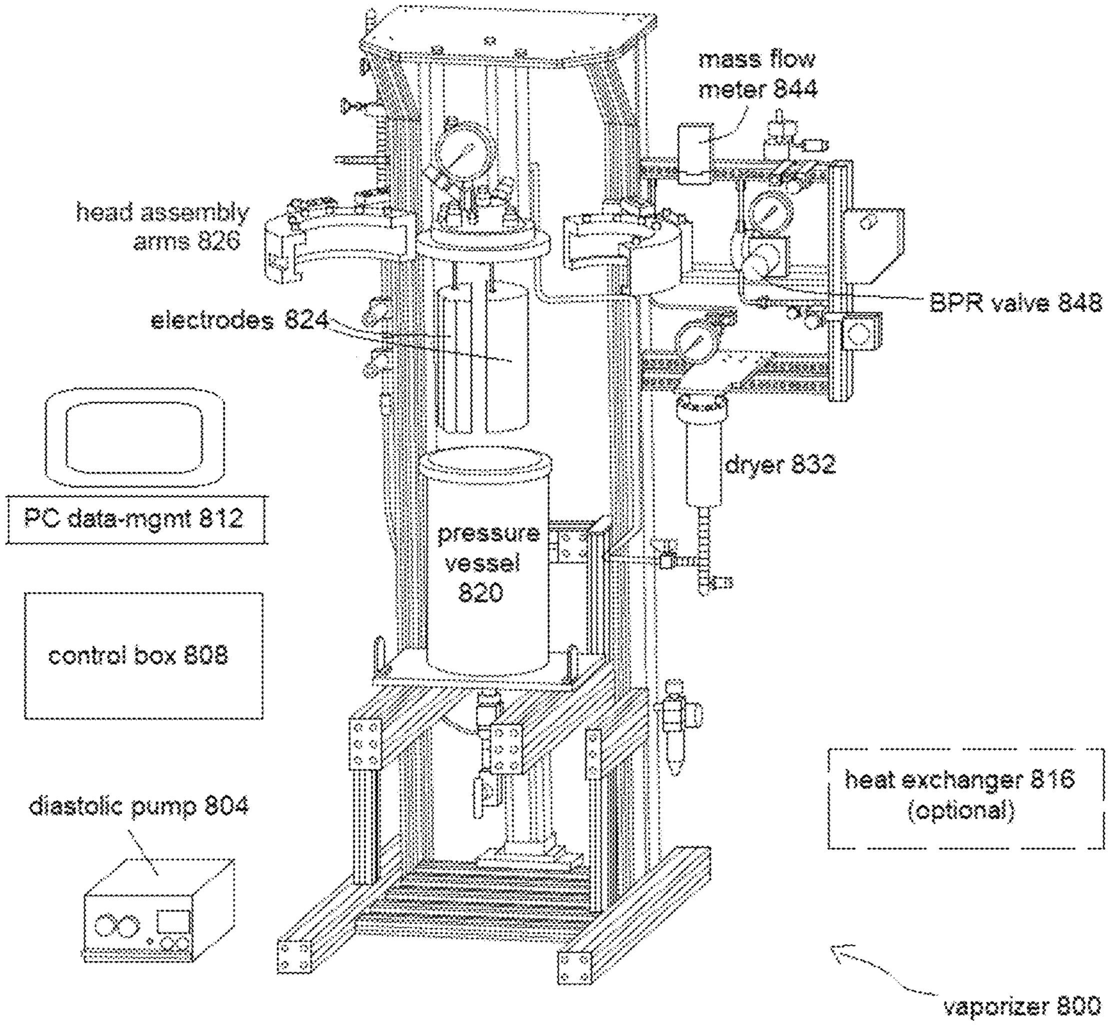
Figure 10A:
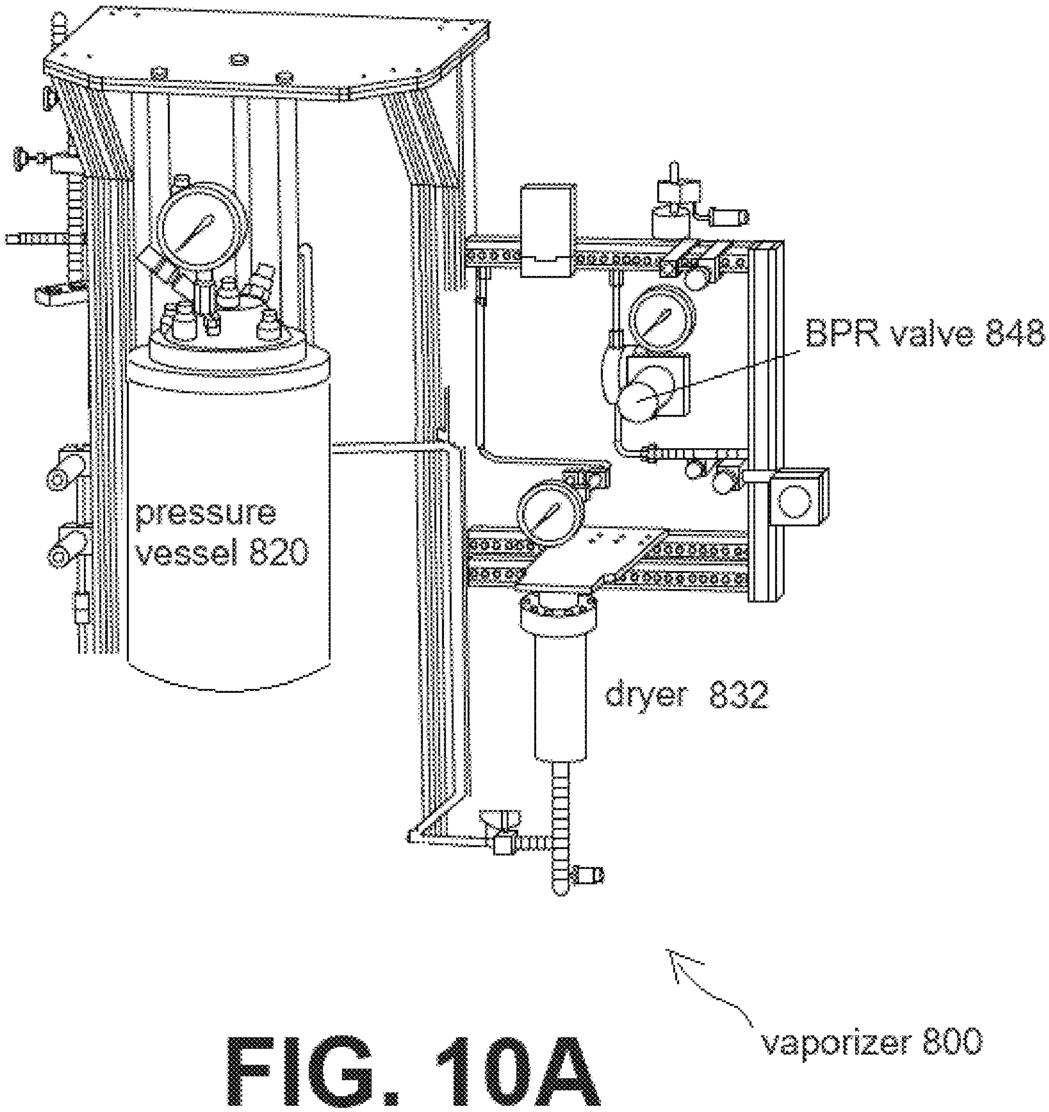
FIG. 10A shows a partial-skeletal view of a vaporizer.
Figure 10B:
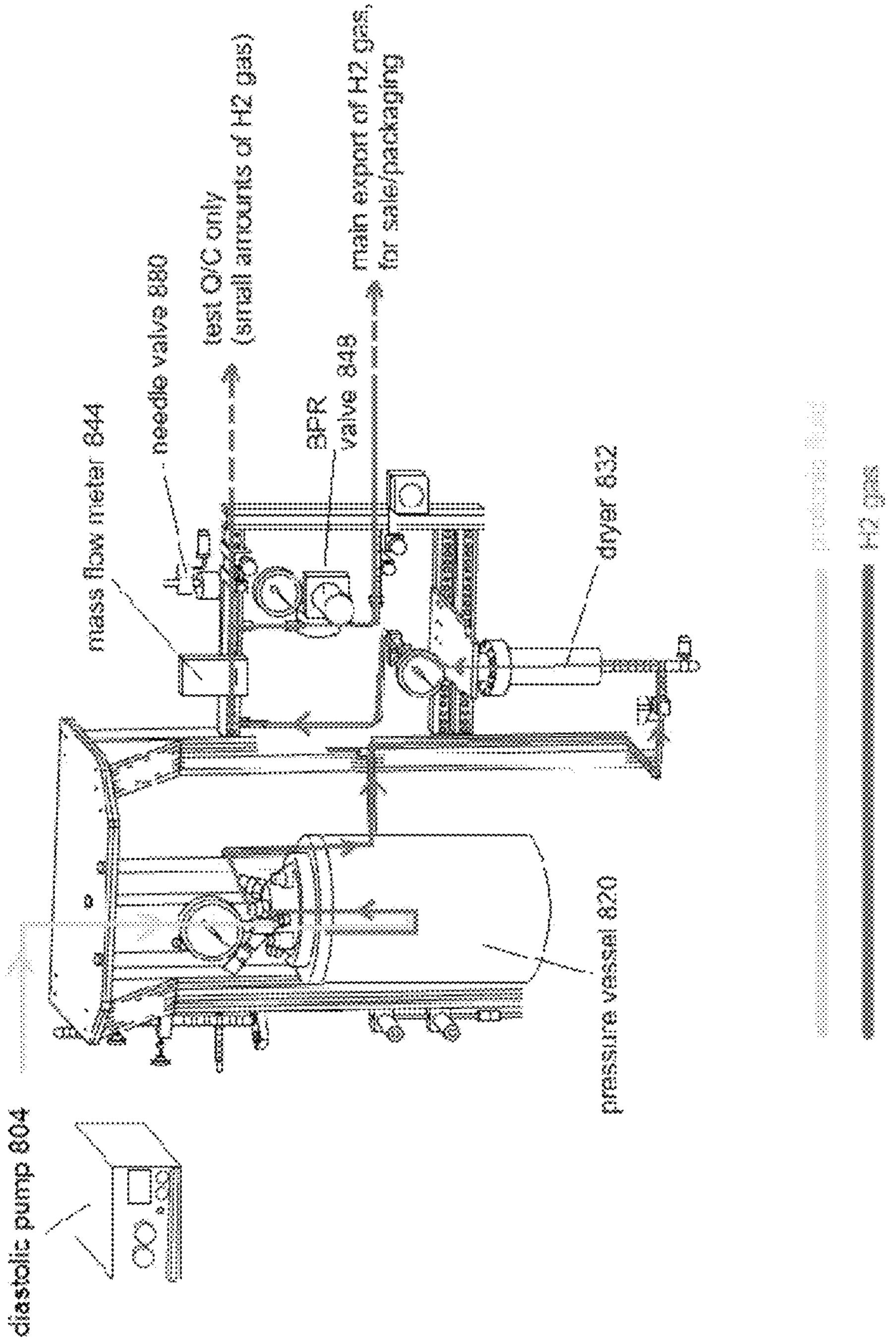
FIGS. 10B-10C shows an example routing of an output fluid being transformed into H2 gas within the vaporizer of FIG. 10A.

FIGS. 8A-8B show components of an example vaporizer 800 alluded to at least within FIG. 1A. Some details of the vaporizer 800 are split out over two separate figures in order to avoid clutter and excess congestion in any single drawing. Also, FIGS. 8A-8B show the vaporizer 800 in an open (non-use) position so that more components are visible, while FIGS. 10A-10B shows the vaporizer 800 in a closed position. From FIGS. 8A-8B it is apparent that the vaporizer 800 comprises a diastolic pump 804 used in forwarding the proton-rich atomic hydrogen output fluid 140 into a pressure chamber 820. Two or more electrodes 824 act to assist in transforming the output fluid 140 from liquid state into a gaseous state.

The table 836 acts to lift and move the pressure vessel 820 into operating position, and is raised and lowered by the up-down table switch 840. The pressure vessel 120 is capable of sustaining chemical reactions at a wide variety of pressures, and thus is very durable and strong. An example range of potential pressures for the pressure vessel 120 might be from 0 PSI to 12,000 PSI. Thus, the pressure vessel 820 must be manufactured of very high durability components, and (during operation) is locked into position by the two head assembly arms 826. In the event of an unexpected reaction, the safety pop-off valve (blowout cap) 828 can release pressure if needed. In the event of a pressure overload, the safety pop-off valve 828 operates to evacuate unexpected volumes of gas, thereby reducing the risk of explosions.

The vaporizer 800 further comprises a dryer 832, one or more mass flow meters 844 (which can be located in a variety of positions within the path of the H2 gas being formed), and a Back Pressure Release (BPR) valve 848. As the vaporizer 800 is being used, it's possible to check and ensure proper operation by viewing information from the mass flow meter(s) 844. Partly because the input fluid 101 may often start out as water-based, it's possible that some water will find its way into the vaporizer 800. The dryer 832 removes any such water, which in turn means the resulting H2 gas has a higher level of purity.

The BPR valve 848 works with the specially-configured dryer 832 to be in-line as part of the vaporization process, fully pressurized, so that the resulting H2 gas is ready to sell immediately (AKA retail-ready). In conventional vaporization, compression activities add moisture, which means additional drying must occur down-line from the compression, thus must occur later in some type of extra step. In sharp contrast, the arrangement of the vaporizer 800 eliminates this problem. That is, the BPR 848 working directly in-line with the dryer 832 which means the vaporizer 800 is more retail-ready. This in turn means the vaporizer 800 working with the reactor system(s) 100 can provide retail-ready customer-ready H2 gas more quickly, in a wider variety of environments.

The BPR 848 is helpful for adjusting amount of liquid volume within the pressure vessel 820 being exposed to the electrodes 824. The BPR valve 848 provides thus retail-ready H2 gas at any pressure desired by any customer, without the need of an additional compressor or PRU (Pressure Reducing Unit).

The BPR valve 848 is always positioned behind the pressure chamber 820. Most other vaporization arrangements do not have in-line pressure adjustment within their H2 production arrangements. Instead, it is customary to use a second compressor. Unfortunately for these arrangements, pressure fluctuation can harm the effectiveness of the drying process, so it's best to avoid changing pressure during a drying process.

Conventional ways of producing H2 gas involve setting a compressor either to the SMR or electrolyzer output pressure so as to achieve a required customer pressure. That is, conventional H2 producers must use a compressor to prepare high-pressure canisters or containers e.g. 10K PSI (a common H2 customer requirement). Meanwhile, the embodiments herein produce such containers, at the desired pressure e.g. 10K PSI, without an external compressor. Instead, the BPR 848 can achieve pressures according to what a customer wants.

The vaporizer 800 achieves high pressure gas production without the need of an additional compressor, thereby achieving high pressure retail-ready containers of H2 e.g. ranging between 300 PSI and 10 K PSI.

In an embodiment, the BPR valve 848 is a variable speed pump, AKA a variable gas valve, which can change the volume of gas with movement of a dial. Even more convenient, an embodiment facilitates changing the BPR valve 848 using a GUI e.g. GUI 1100, through the PC data-mgmt 112 working with the control box 808. Volume of liquid is directly proportional to efficient power factor load. The embodiments herein can adjust a volume of liquid present in the pressure vessel 820 according to a power factor reading from a customized power supply 882 (FIG. 8E). This reading may come through a GUI 1100 posted on the PC data-mgmt 812.

The dryer 832 operates at whatever pressure is determined by the BPR 848. Thus, any outgoing pressure of the H2 gas can be adjusted to customer requirements using the BPR 848, because the BPR 848 is close to the dryer 832.

The heat exchanger 816 is an optional component which provides value by pulling out heat out (like a car radiator) of the pressure chamber 820, or can be used to put heat in.

Figure 11:
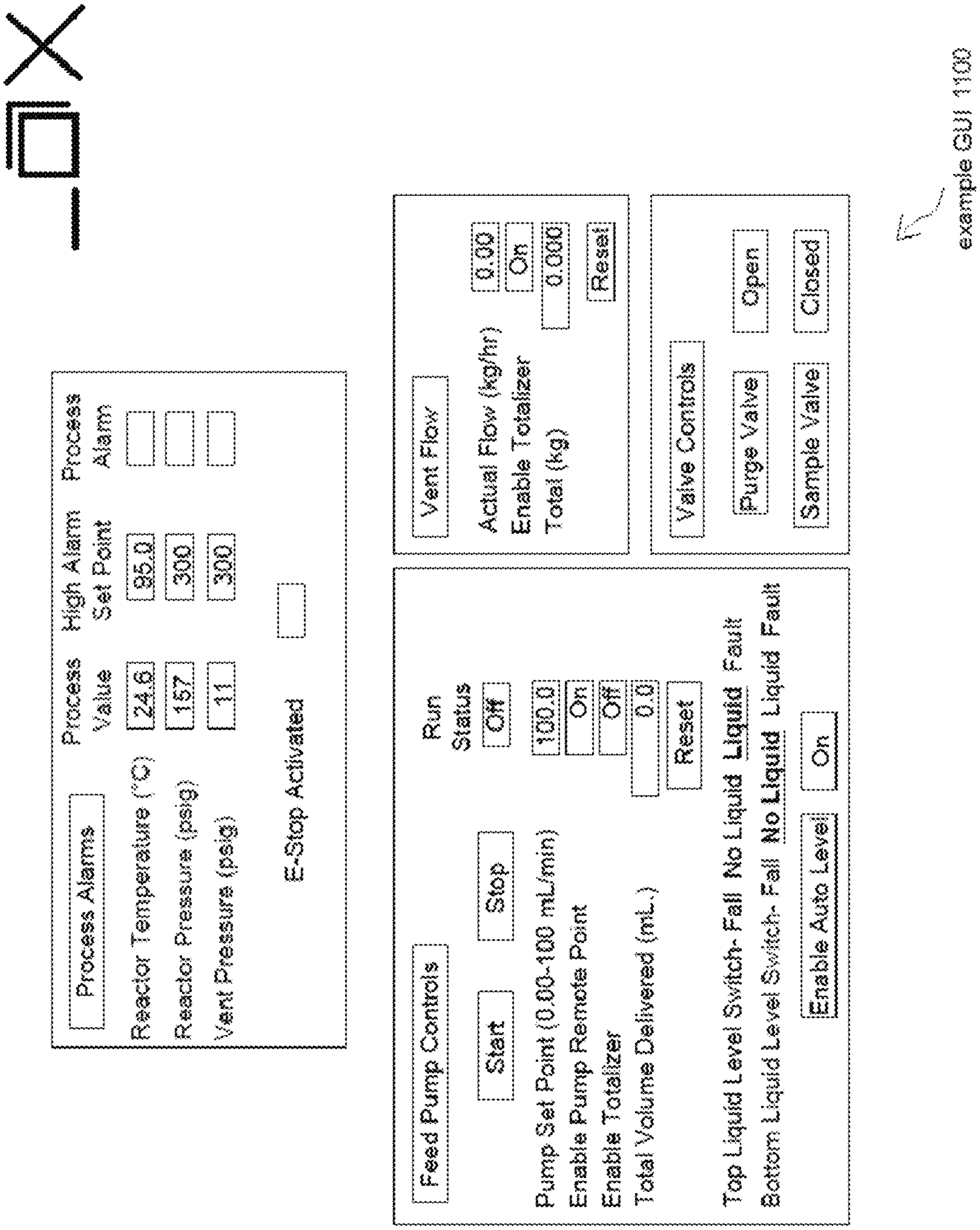
FIG. 11 shows an example GUI within a PC data management system.

Next, operating the vaporizer 800 is a complex task with a lot of moving parts and elements, often changing simultaneously. The control box 808 works with a PC-dataMgmt product 812 to display software menus and GUIs to assist the operator in making decisions. One example GUI 1100 is shown in FIG. 11, but many more GUIs exist although for brevity are not described herein.

Figure 8C:
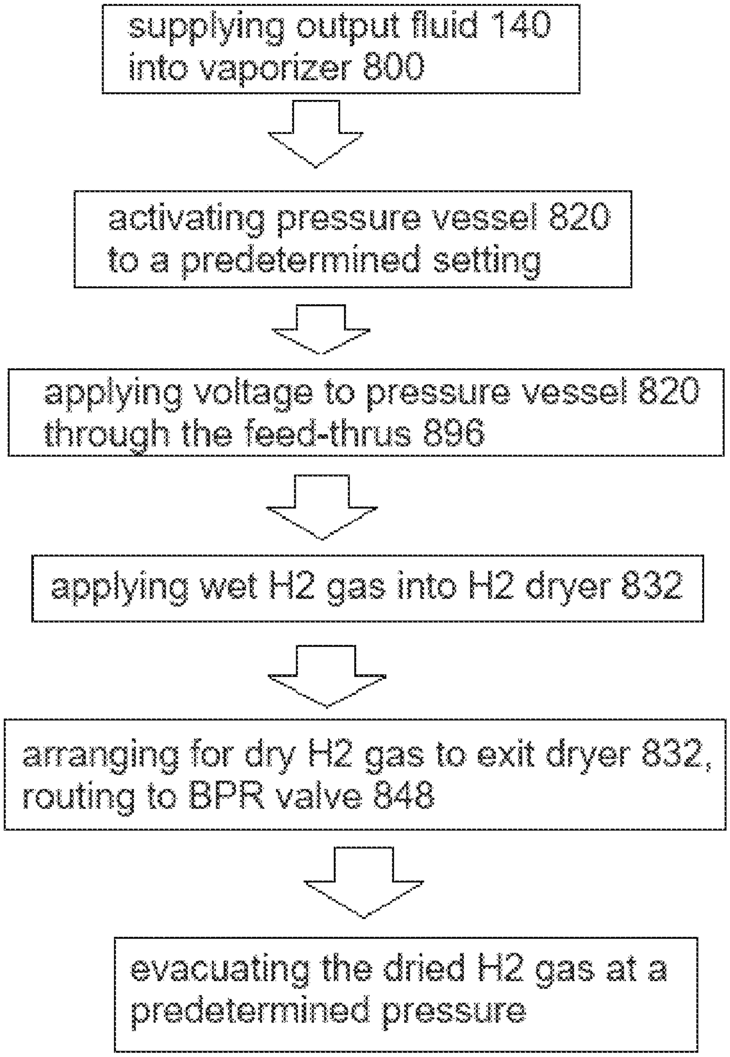
FIG. 8C shows an example method of operating the vaporizer of FIGS. 8A-8B and 8D-8E.
Figure 8D:
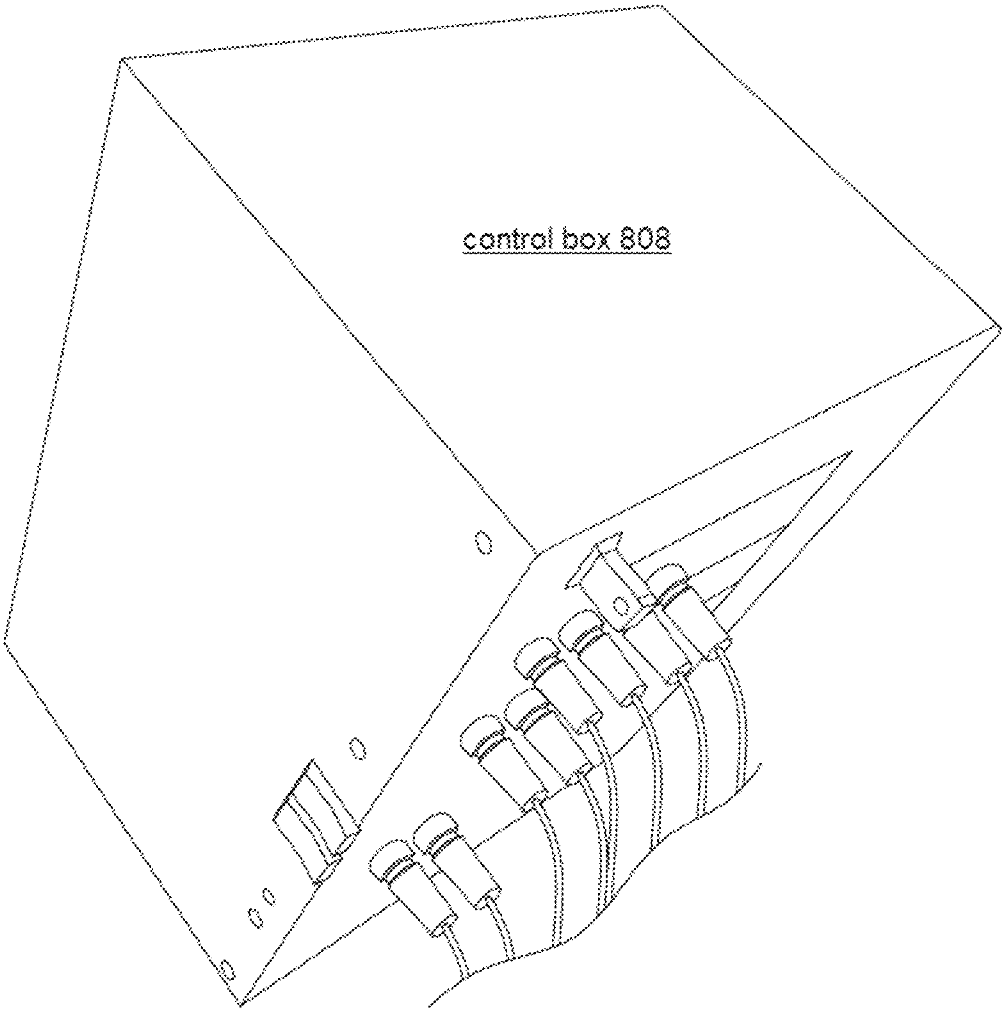
Figure 8E:
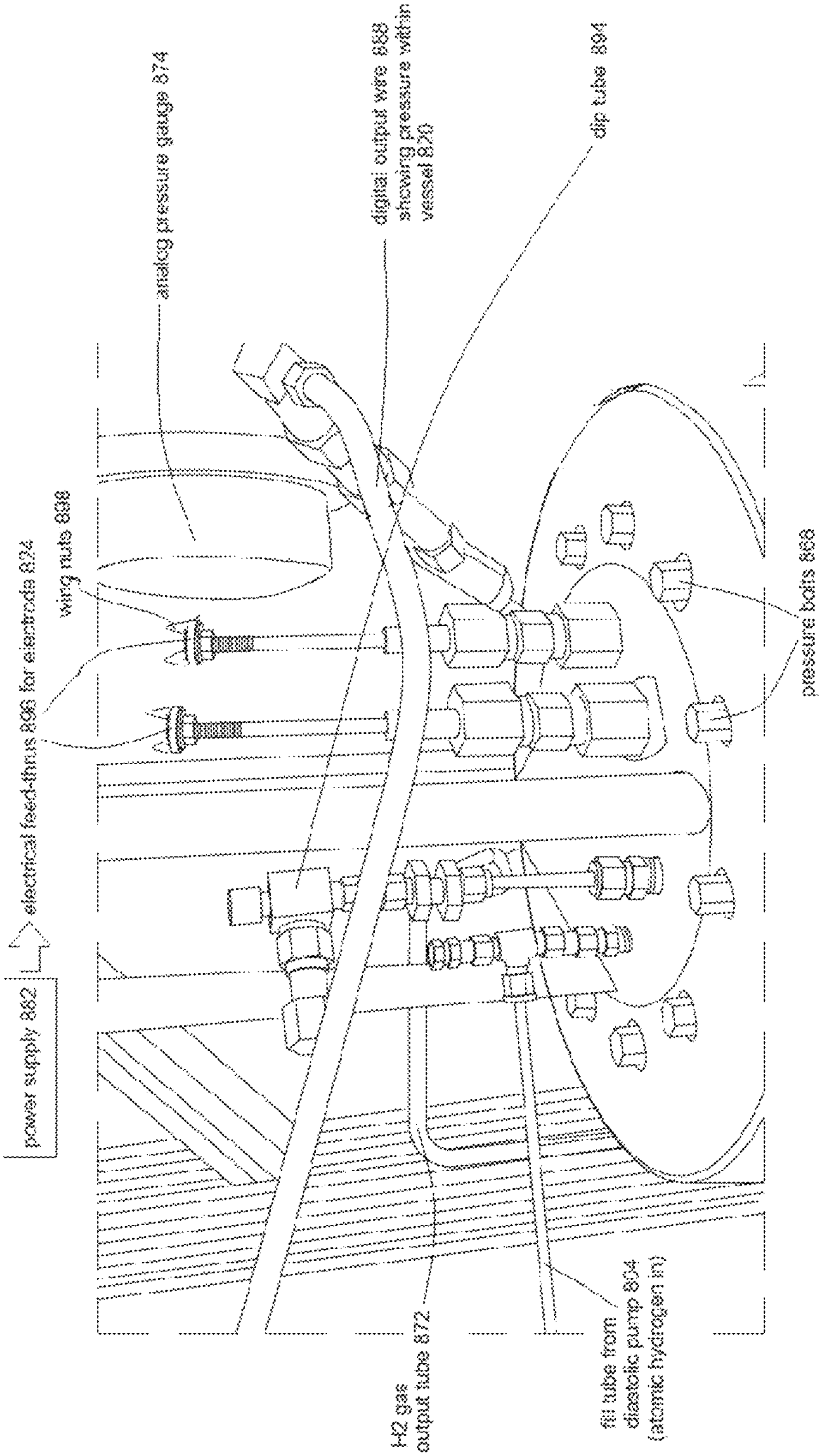

FIG. 8C shows an overview flowchart of some of the key tasks performed by the vaporizer 800. FIGS. 8D and 8E show more detail of the vaporizer 800, including an example control box 808 and also more detail of an upper surface of the pressure vessel 820. Some portions of FIG. 8E are not easily visible from the views shown in FIGS. 8A and 8B, such that an additional drawing is necessary.

From FIG. 8E it is apparent that the vaporizer 800 further comprises an arrangement of pressure bolts 868, spaced circumferentially around the upper surface of the pressure vessel 800. The pressure bolts 868 act as flange seal bolts, and are installed with adjustable torque depending a desired pressure within the vessel 820.

The electrical feed-thrus 896 for the electrodes 824 are located at the top of the pressure chamber 820, and have wing-nuts 898 for quickly attaching and detaching wiring from a particular power source. In an embodiment, the customized power source 882 is suitable for driving the two electrodes 824 through the electrical feed-thrus 896. The customized power source 882 provides AC electrical power at high current levels and low voltage levels, which is helpful in driving the chemical reforming process occurring within the vaporizer 800. Various embodiments of the customized power source 882 leverage a variety of configurations of a SMPS (Switch Mode Power Supply) technology using an architecture that eliminates extra stages of conversion compared to how it would commonly be done using conventional SMPS mechanisms.

A dip tube 894 is useful for providing information about level and status of liquid-levels within the pressure vessel 820. The dip tube 894 must be a total and complete non-conductor, so that proper composition is critical. The dip tube 894 must be present at very high temperatures and pressures, yet cannot have metal components as that might interfere with the reactions occurring inside the pressure vessel 820. Some suitable materials for the dip tube 894 can comprise non-melting plastic, graphite, a ceramic base, or potentially a high-temp fiberglass molded embodiment.

The digital output wire 894 connects to the control box 808, but also connects to the analog pressure gauge 874. Proper monitoring of the pressure within the pressure vessel 820 is critical to its successful operation. The fill tube brings output fluid 140 from the diastolic pump 804, and thus supplies the proton-rich atomic hydrogen output fluid 140 into the vaporizer 800. Finally, the output tube 872 is where the processed H2 gas exits, which is the main point of the vaporizer 800, to effectively product H2 gas at high volume and high purity.

Figure 9:
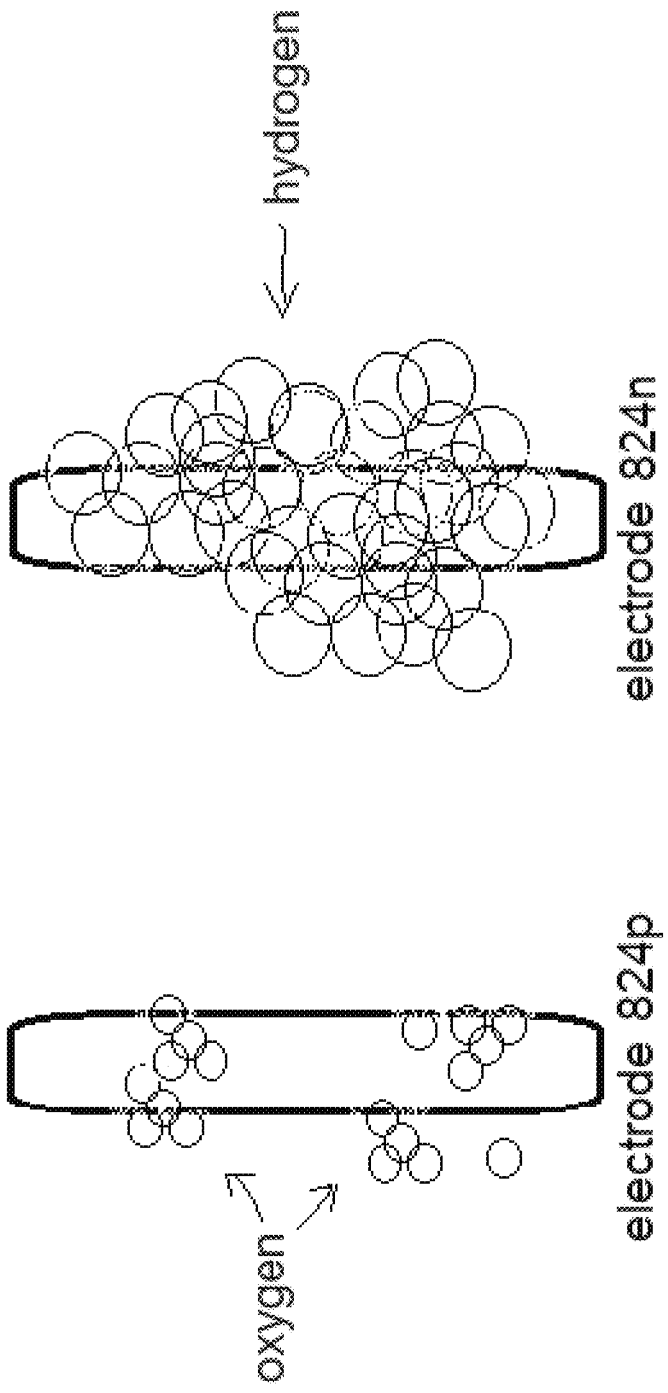
FIG. 9 shows some detail of an operation of the vaporizer of FIGS. 8A-8B and 8D-8E.

In a simple visual bubble test the extreme hydrogen content within the output liquid 140 was demonstrated. FIG. 9 shows high speed photography of bubbles on electrodes 824 within an example vaporizer 800. In this specific test scenario, 316 stainless steel was used for the electrodes 824. The specific test involved adjusting voltage until a measurable amount of gas came off the positive electrode 824*p* without saturating a gas field at the negative electrode 824*n*. The resulting bubble columns were photographed at high speed, so as to freeze and thus properly convey the bubbles. The relative gas volumes are then calculated.

As stated earlier, the positive electrode 824*p* and negative electrode 824*n* are both located inside the pressure vessel 820, and activated for the purpose of generating H2 gas. From FIG. 9 it is apparent that oxygen is produced at the positive electrode 824*p*, and hydrogen is produced at the negative electrode 824*n*.

In normal convention hydrolysis, a gas volume at the negative electrode will be 2× the gas volume at a positive electrode. Within the embodiments herein, a much higher volume of H2 gas is produced. FIG. 9 shows the disparity in reaction between the two electrodes 824*p*/824*n*, and is intended to convey that the positive electrode 824*p* has noticeably less bubbles and smaller bubbles than the negative electrode 824*n*. FIG. 9 is, like all Figures herein, intended for illustration-only, should not be considered limiting, and proportions may be exaggerated or reduced for clarity and to convey the main points. The bubble sizes and amounts shown in FIG. 9 are not meant to literally convey exact proportions.

From FIG. 9 it should be apparent that the negative electrode 824*n* has many more bubbles than the positive electrode 824*p*, and also has larger bubbles. One example size-proportion can be where the bubbles at the negative electrode 824*n* are ~2.8 times the size of the bubbles at the positive electrode 824*p*. Further, an example amount-proportion can be where bubbles at the negative electrode 824*n* occur ~17 times the amount of bubbles at the positive electrode 824*p*. Again, these stated proportions may not exactly conform with what is visually conveyed in FIG. 9.

Combining the bubble sizes and amounts affirms that the negative electrode 824*p* produces ~48 times the gas volume of the positive electrode 824*p*, which in turn means that the vaporizer 800 can produce at least 48 times as much H2 gas as oxygen gas, and potentially even more. This proportion can be changed depending on the proton-concentration in the input fluid 101, as well as amount of time within the various tanks within the reactor system 100, the amount and positioning of magnets or magnet packs 508. Other variations may include the type of power supplied to the electrodes 824*p*/824*n* (through the electrical feed-thrus 896). For example, supplying DC power to the electrodes 824*n*/824*p* may have higher production of H2 gas than supplying AC power, because DC power may cause hydrogen to have an affinity for the cathode 824*p* (for brevity, not overtly shown in FIG. 9).

Within the embodiments herein, measurements are important. One example is checking for Faradaic Efficiency (FE), which pertains to the processes governed by Faraday's laws of electrolysis. These laws relate to a relationship between the amount of substance altered at an electrode during electrolysis and the quantity of electricity used during that alteration. Faradaic efficiency thus measures the efficiency with which electric power is converted into a desired chemical product during electrolysis.

As such, within the vaporizer 800, one goal is to achieve 100% Faradaic efficiency. This can be achieved if all the electrical energy supplied is used for the production of hydrogen gas, without losses due to side reactions or energy inefficiencies. This implies an optimal conversion rate where the electrical charge contributes directly to the desired gasification reaction, marking a significant leap in the field of electrolysis-based hydrogen production.

One way to assess Faradaic Efficiency is by measuring temperature at various places in the vaporization process, weighing electrodes 824 before and after gasification, and checking for any losses along the various elements of the vaporizer 800.

Achieving 100% Faradaic Efficiency is advantageous for minimizing energy loss, thereby enhancing the overall energy efficiency of H2 gas production. This efficiency is in turn helpful for the economic viability and environmental impact of hydrogen as a clean energy carrier.

Next, some notes on energy states. H2 is required to be neutral, and covalently bonded. To achieve this, some electrons are needed. IOW, diatomic H2 does not occur without at least some electrons, a balance electrons. As stated earlier, the output fluid 140 is intentionally configured to be in an unbalanced electron-deficient state so that when electrons are given to the fluid through absorption, H2 is created.

H2 is the lowest energy state. Meanwhile, the output fluid 140 exists in an unbalanced energy state, so adding electrons allows the fluid to achieve neutrality and/or a lower energy state. That in turn occurs in the creation of H2 gas.

Once the embodiments herein give the output fluid 140 a bump with electrons, natural entropy takes over and nucleation occurs, thereby allowing H2 to be created. H2 gas is a lower energy state than HEZ, because it's neutral. This is somewhat comparable to a rock that is rolling downward, but finally reaches the bottom of a hill and coms to a halt. The rock stopped rolling because it reached a lower energy state.

The customized power supply 882 assists in achieving an optimal voltage for effective nucleation, sometimes referred to as an Overall Nucleation Voltage (ONV). An Overall Nucleation Voltage is applied to the electrodes 824 by the power supply 882. In an embodiment, an ONV voltage could range between a minimum of 0.02V and a maximum of 1200V, and can be either AC or DC.

The embodiments herein strive to affirm\verify that any gains in potential mass achieved during the vaporizing steps of claim 1 are directly attributable to a plurality of absorbed electrons. This can be affirmed by measuring the potential mass of the absorbed electrons by assessing degradation of a the specially-configured material which makes up the electrodes 824.

In doing this affirming, it is helpful to note that there is nowhere else the gain in potential mass could come from, other than absorbed electrons. Since the reactor pressure vessel 820 is sealed, there can't be anything else in there. As such, one can affirm that the plurality of absorbed electrons are increasing an energy potential present in the output fluid 140. Calculating the energy potential due to absorbed electrons can be achieved in a way similar to calculating compounding interest.

Figure 10C:
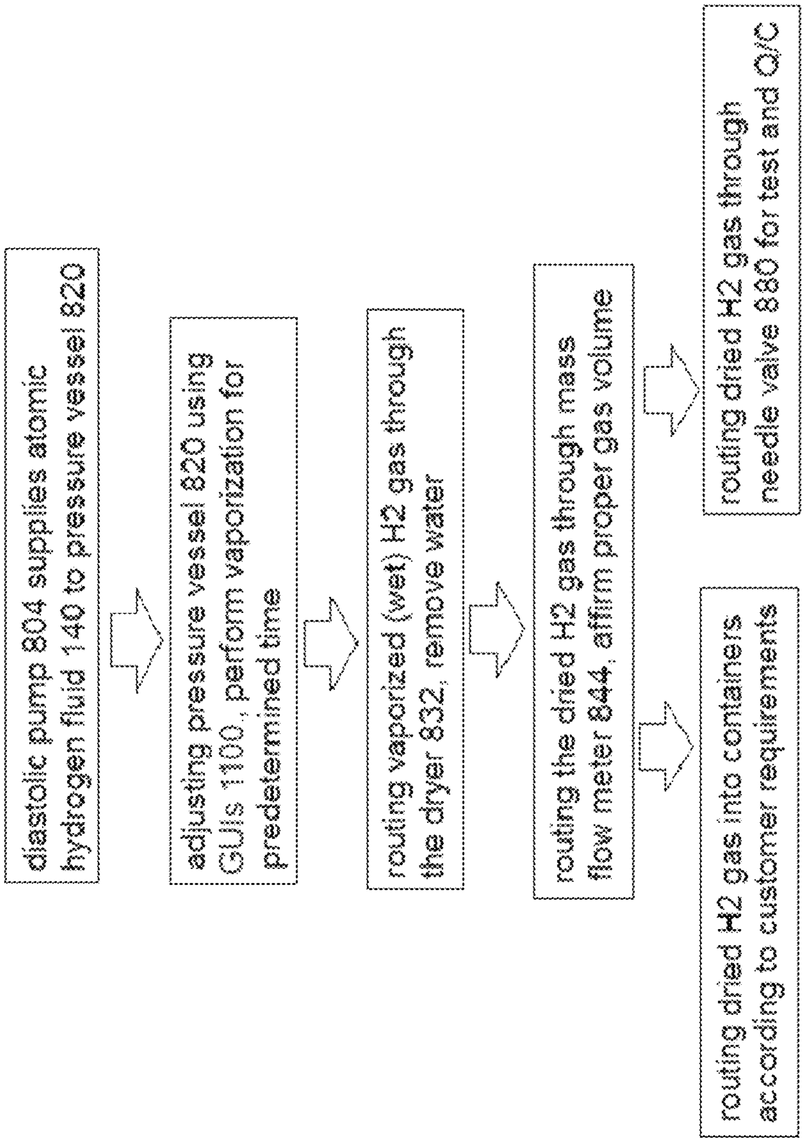

FIGS. 10A-10B-10C show some aspects of the operation of the vaporizer 800. FIG. 10B shows the exact paths and routing of the H2 gas. FIG. 10A is provided as a contrast where no gas is shown, so that the reader can recognize the path(s) taken by the H2 gas as it exits the pressure chamber 820. FIG. 10B might be clearer if one can first see FIG. 10A.

Specifically, as shown in FIGS. 10B and 10C, the H2 gas is dried at dryer 832, then flows the through a mass gas analyzer 844, which can be positioned either before or after the BPR valve 848, or both before and after. The BPR valve 848 works closely with the pressure chamber 820, and is also connected to the control box 808 and is operated to achieve a wide variety of vaporization tasks and densities.

Finally, as shown in FIGS. 10B and 10C, the ready-for-sale H2 gas exits the vaporizer 800 in two different locations, one of which is through the needle valve 880 so as to test and affirm quality levels of the H2 gas. However, the higher volume of H2 gas will be sent out another port, where it can be put into containers and sold.

In FIGS. 10A-10B, the vaporizer 800 is only partially shown, with some elements intentionally omitted. These views are with the vaporizer 800 in "closed" mode, that is, suitable for doing vaporization activity. However, the electrodes 824 are present therein, but is blocked from view by the body of the pressure chamber 820.

FIG. 10C is different than FIG. 8C. Both discuss operation of the gasifier 800, but FIG. 10C focuses more on the routing of the actual H2 gas, while FIG. 8C focuses more on the sequence and steps in creating the H2 gas, not so much the routing.

FIG. 11 shows an example GUI 1100 shown within a display of the PC data management system 812. There are many more GUIs and arrangements than what is shown in FIG. 11, which is for example and clarification-only and should not be considered limiting. The PC data management system 812 works with the various elements within the vaporizer 800 through the control box 808.

Figure 12A:
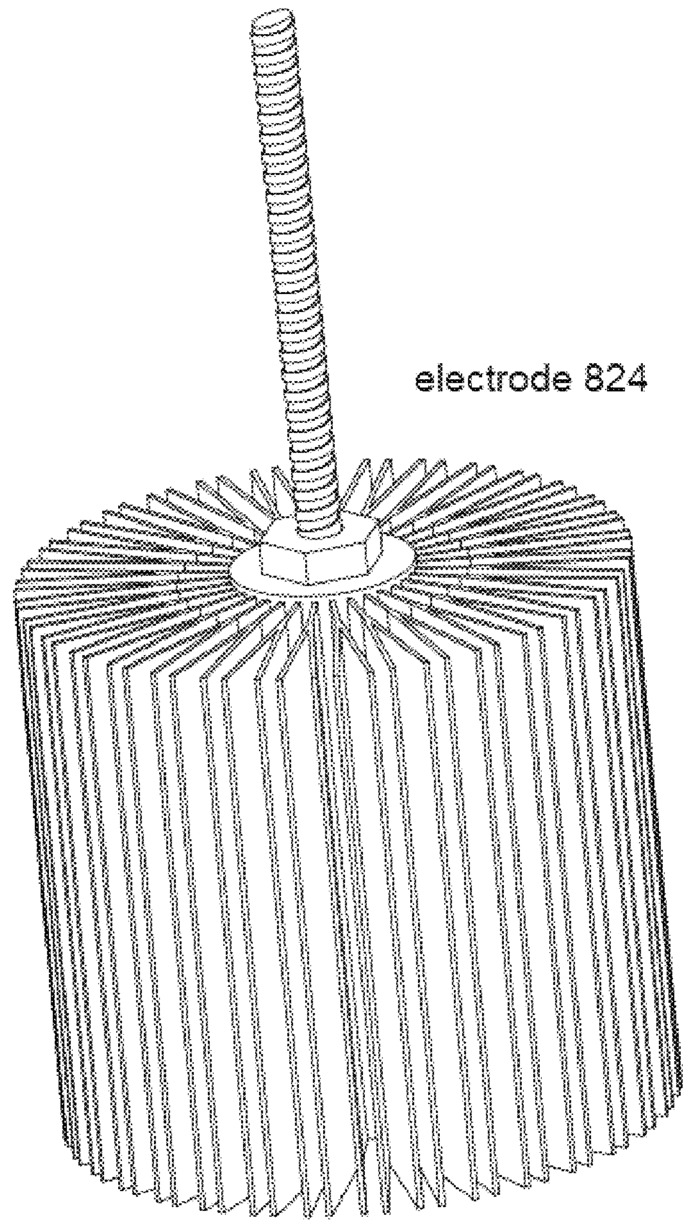
FIGS. 12A-12B-12C show example electrodes.
Figure 12B:
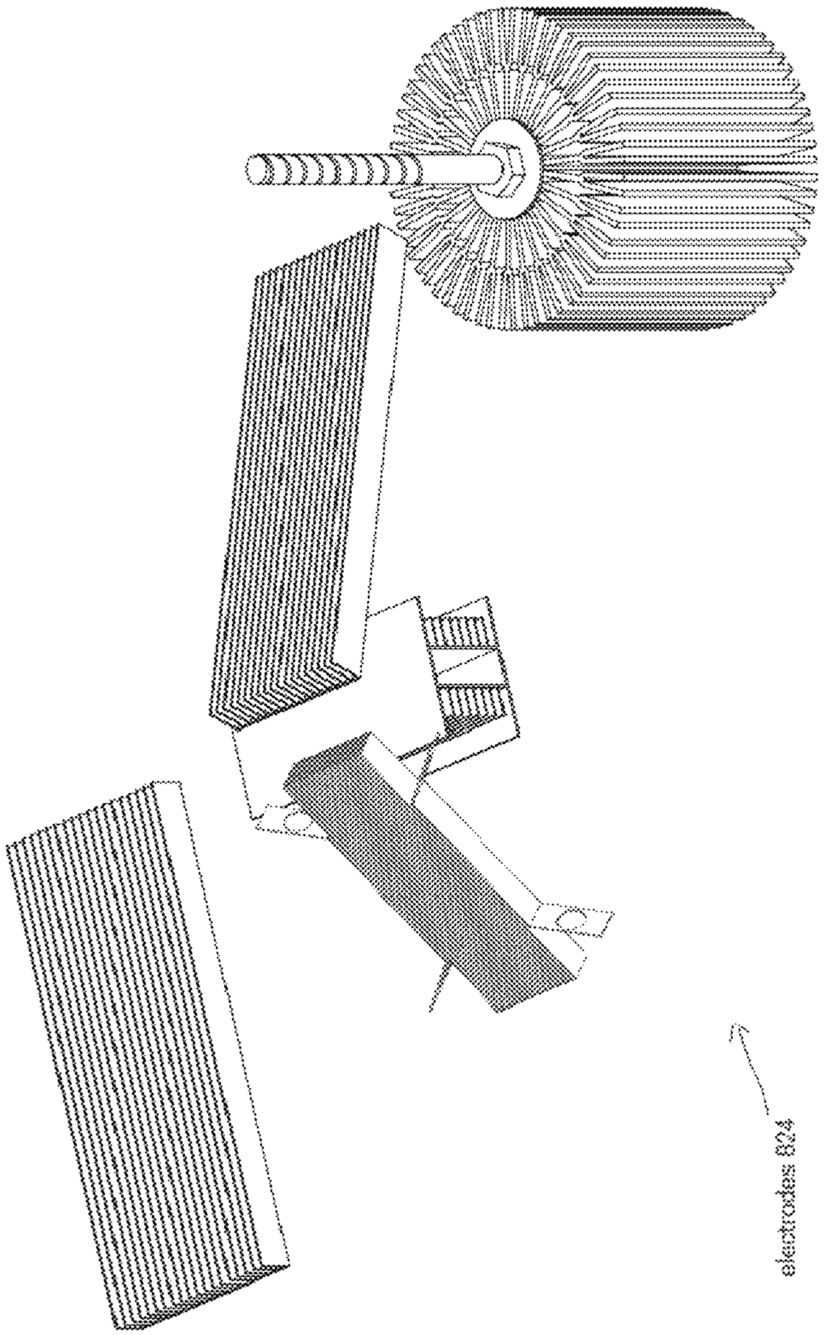
Figure 12C:
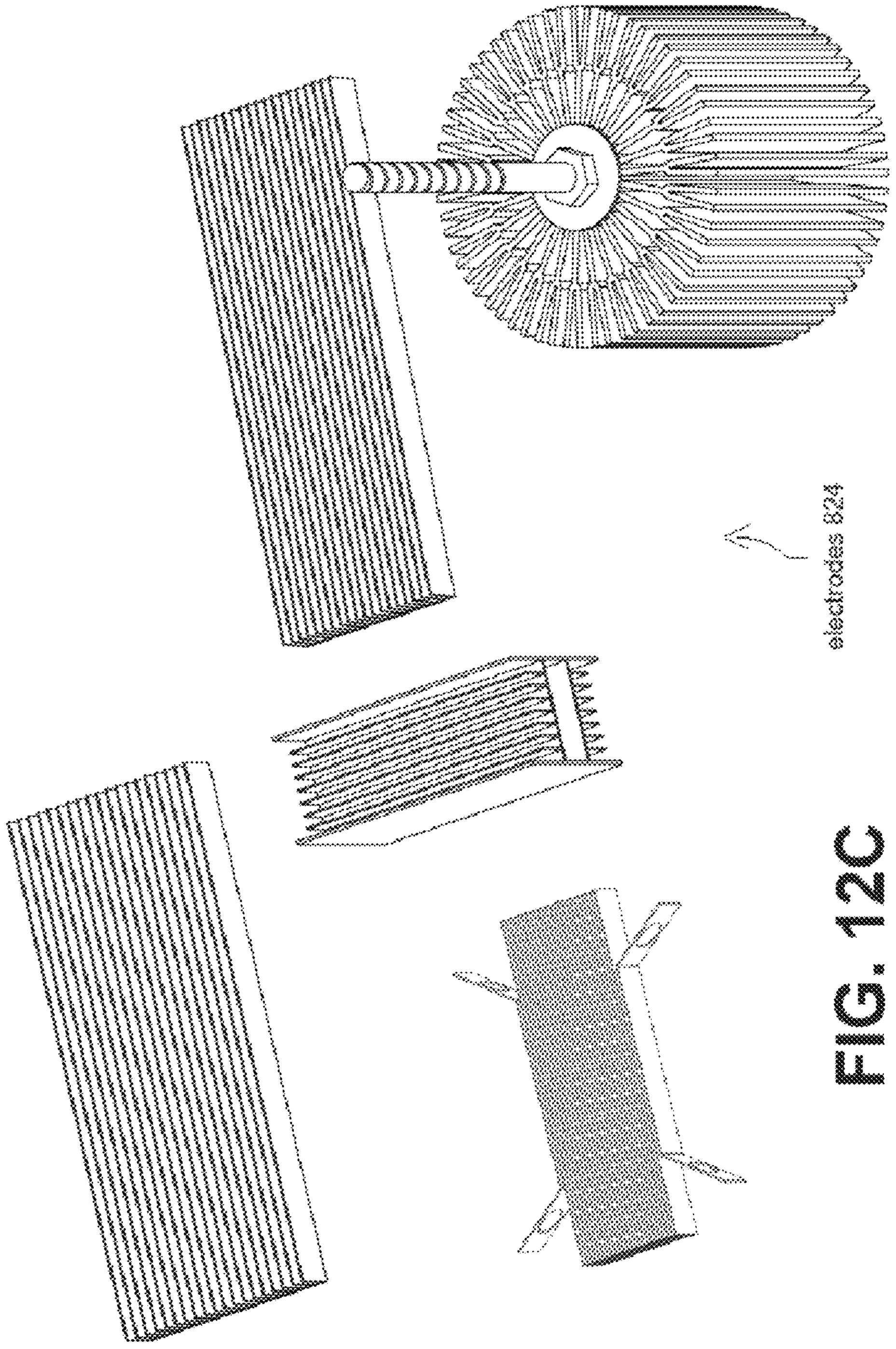

FIGS. 12A-12B-12C show example shapes and contours of the electrode 824. As shown in FIGS. 12A-12B-12C, the electrodes 824 can be a variety of shapes, including rectangular with a square X-section, and can also have ripples or flanges. The electrodes can be made from aluminum RS 6600, iron, or an aluminum-silver combo.

In an embodiment, if the electrodes 824 are powered with A/C, there should be zero or minimal ion donation. There should be no ion transfer, instead all H2 gas should be produced via conductance. That suggests that the electrodes 824 would not even slightly change with each vaporization cycle.

However, it is a general procedure to weigh the electrodes 824 before and after a vaporization process. Ideally, if A/C power is supplied, the weights should not change, or change very minimally. However, D/C might be different than AC, so perhaps some ion transfer occurs. This means there might be some weight-change of the electrodes 824.

Advantages

A non-limiting list of advantageous characteristics of output fluid 140 comprises the following: Output fluid 140 will often have a hydrogen density greater than 110 kg per cubic meter. The bond energy disassociation rate of output fluid 140 is far less than that for input fluid 101. The conductivity of output fluid 140 has been measured to be 3× or greater than copper. The pH of the output fluid 140 will most often be less than 1, yet still is non-corrosive.

The output fluid 140 is stable at normal temperatures and pressures. Output fluid 140 is compatible with existing fuel hydrocarbons such as diesel, fuel oils, etc. When used in an internal combustion engine (ICE), the output fluid 140 reduces emissions by 90% compared to common hydrocarbons. The output fluid 140 is compatible with existing turbines. The hydrogen gas produced from the output fluid 140 is reagent grade or better, and is compatible with existing fuel cell technology. The hydrogen gas produced from the output fluid 140 is compatible with all stationary turbines for power production. The hydrogen gas produced from the output fluid 140 is compatible with HaberBosch processes, and also with products created by Fischer-Tropsch processes.

It is advantageous that the output fluid 140 having low power storage requirements required for vaporization. Lowering energy consumption of the vaporization process (e.g. FIGS. 10B-10C, 8C) is helpful because vaporization then becomes more transportable and can be done in more environments.

Integration with Vaporizer 800

It is conventional to use Steam Methane Reformer (SMR) machines to act as a "cracker" for separating natural gas to yield hydrogen gas. One non-limiting example of an industry using crackers is oil refining. Many oil refineries have an SMR which takes hydrogen out of natural gas, which is useful in a hydrogen demand system. Refineries might also use a standard electrolysis unit which breaks covalent bonds.

The combination of reactor system 100 and vaporizer 800 may be introduced into such a traditional cracker arrangement to substitute for an SMR machine. The embodiments may remove the need for an SMR machines, but also may remove the need for an electrolysis unit. Using the embodiments herein, it becomes possible to locate an exemplary vaporizer 800 downstream from a conventional SMR.

Now imagine introducing the proton-rich electron-deficient output fluid 140 into this SMR scenario. While the output fluid 140 cannot go directly into a tube trailer or cryogenic system, the output fluid 140 could be run through a vaporizer 800, dried, compressed and then made compatible within such common usages such as a tube trailer, a cylinder or cryogenic system, at any pressure needed by a customer.

The following examples present potential parameters and specifications for improving the performance of different hydrogen-based fluids in accordance with various of the embodiments described herein.

Example 1

Assumes a standard boiler burning six liters per minute. The following are steps for making system compatible with output fluid 140.

Separate Fuel Tank;

Measure Total Amount of Fuel—in this example the fuel tank had a capacity of 500 gallons;

Measure 250 gallons fuel oil and 250 gallons of output fluid 140;

Connect fuel line to fuel pump from the combined output fluid 140 and the fuel oil tank;

Agitate the fuel mixture in the combined fuel tank;

Begin standard boiler burner starting procedures; and

Run/Operate boiler.

Example 2

Reciprocating Engine ICE (Internal Combustion Engine)

The engine used to test output fluid 140 was a standard Caterpillar 3606 engine.

Separate Fuel Tank;

Measure Total Amount of Fuel-in this example the fuel tank had a capacity of 500 gallons;

Measure 250 gallons diesel and 250 gallons of output fluid 140;

Connect fuel line to fuel pump from the combined output fluid 140 and the diesel tank;

Agitate the fuel mixture in the combined fuel tank;

Begin standard engine starting procedures; and

Run/Operate engine.

Example 3

Add 500 gallons of common water to first tank 104;

Add 500 gallons of common water to second tank 108;

Set recirculator 104*r* to 50,000 Gauss;

Set recirculator 108*r* to 46,000 Gauss;

Set electrostatic charge on 104*cs* to 1000 watts;

Set electrostatic charge on 108*cs* to 1000 watts;

Recirculate first tank 104 for 45 mins;

Reticulate second tank 108 for 45 mins;

Begin transferring 104 and second tank 108 to third tank 112;

Set recirculator 112*r* to 48000 Gauss;

Recirculate third tank 112 for 75 min;

Transfer completed output fluid 140 to storage tank;

Take output fluid 140 and place into gasifier;

Set gasifier voltage to 1.3 volts and 108 amps;

Begin to capture total gas produced;

Analysis of gas via total mass gas analyzer for purity confirmation;

Validate that the output fluid 140 will show results of greater than 90% pure H2 gas by molecular weight;

Process complete and output fluid 140 has been validated; and

Test three batches of the output fluid 140 against a control material e.g. pure hydrogen.

Appendix A: Example Hydrogen-Donating Fluids

A non-limiting list of potential types of hydrogen-donating fluids can include but is not limited to e.g., HCl—hydrochloric acid, HNO3—nitric acid, H2SO4—sulfuric acid, HBr—hydrobromic acid, HI—hydroiodic acid, HClO4—perchloric acid, HClO3—chloric acid, HO2C2O22H—oxalic acid, H2SO3—sulfurous acid, H2O—water, HSO4—hydrogen sulfate ion, H3PO4—phosphoric acid, HNO2—nitrous acid, HF—hydrofluoric acid, HCO2H—methanoic acid, C6H5COOH—benzoic acid, CH3COOH—acetic acid, HCOOH—formic acid, C6H8O7—citric acid, C18H36O2—stearic acid, CH3OH—methyl alcohol, CH3CH2OH—ethyl alcohol, CH3 (CH2) 3OH—n-butyl alcohol, C3H8O—propanol, CH3CH2CH2OH—n-propyl alcohol, (CH3) 3COH—t-butyl alcohol, CH3 (CH2) 4O—n-pentyl alcohol, and (CH3) 2CHOH—isopropyl alcohol.

Appendix B: Specification-Only Stubs That May Later Be Asserted as Claims

X. An apparatus for concentrating atomic hydrogen in a liquid comprising: a first zone surrounding a liquid, the first zone circumscribed by a conductor that is discretely energized with alternate first and second electrical polarities; a second zone in fluid communication with the first zone, the second zone circumscribed by a plurality of magnets that are discretely energized with alternate first and second magnetic polarities.

X. A method for driving an overabundance of atomic hydrogen in a liquid comprising; placing a liquid in a static electric field having a first polarity; passing the liquid through a static magnetic field having a first polarity; passing the liquid through a static electric field having a second polarity; passing the liquid through a static magnetic field having a second polarity; and passing the liquid through an oscillating magnetic field.

X. The method of Claim X, further comprising:

affirming that the plurality of absorbed electrons are increasing due to an energy potential in the output fluid; and calculating the energy potential from the absorbed electrons in a way similar to calculating compounding interest.

X. The method of Claim X, further comprising:

. . . generating the output fluid so as to be electron deficient;

. . . generating the output fluid to remain electron deficient at STP;

XX. The method of Claim X, further comprising:

configuring the reactor/system and vaporizer system such that a first predetermined amount of output fluid is transferred into the vaporizer system;

performing a vaporizing step; and a chamber of the vaporizer system then containing a second predetermined amount of H2 gas.

X. The method of Claim XX, further comprising:

the static mixer(s) applying a pre-configured magnetic field to the circulating fluid, therefore creating a proton-rich vortex within the static mixer.

X. The method of Claim XX, further comprising:

the reactor system removing electrons from the fluid in such a way that the resulting output fluid has super-conductive properties.

X. The method of Claim XX, further comprising:

the reactor system removing electrons from the fluid in such a way that the resulting output fluid is electron-deficient and remains so indefinitely at STP (NTP).

X. The method of Claim XX, further comprising:

the reactor system removing electrons from the fluid in such a way that the resulting output fluid is electron-deficient and remains so indefinitely at STP (NTP).

X. The method of Claim XX, further comprising:

the reactor system removing electrons from the fluid in such a way that the resulting output fluid has a liquid density within a range of X<range<Y.

X. The method of Claim X, further comprising:

pre-configuring the outputted processed liquid to have a potential mass greater than its liquid mass after a vaporizing step;

vaporizing the processed liquid;

affirming\verifying that the gains in potential mass achieved during the vaporizing step are attributable a plurality of absorbed electrons;

measuring the plurality of absorbed electrons using a voltmeter; and measuring the potential mass of the absorbed electrons using a mass flow meter test equipment.

X. The method of Claim X, further comprising:

the plurality of absorbed electrons increasing in a compounding fashion;

calculating the compounding of the absorbed electrons in a way similar to calculating compounding interest.

XX. A method for driving an overabundance of atomic hydrogen (protonic fluid) in a liquid comprising;

placing a liquid in a static electric field having a first polarity;

passing the liquid through a static magnetic field having a first polarity;

passing the liquid through a static electric field having a second polarity;

passing the liquid through a static magnetic field having a second polarity; and passing the liquid through an oscillating magnetic field.

X. A method of converting a customized proton-rich fluid into H2 gas, comprising:

transferring a predetermined amount of the proton-rich fluid into a vaporizer;

setting a voltage-mechanism within the vaporizer voltage to a predetermined voltage and predetermined current;

beginning capturing a total gas produced from the proton-rich fluid;

analyzing the produced gas using mass gas analyzer for purity confirmation; and testing a plurality of batches of the protein-rich fluid against a control material.

X. The method of Claim X, further comprising:

using pure hydrogen for the control material.

X. The method of Claim X, further comprising:

calculating an energy potential due to absorbed electrons using methods similar to calculating compounding interest.

What is claimed is:

1. A method of operating a vaporizer for transforming atomic hydrogen output fluid into H2 gas, comprising:

a reactor system transforming a water-based input fluid into a proton-rich atomic hydrogen output fluid;

configuring a first enclosed zone for receiving and circulating the input fluid;

arranging a first conductor in a circumferentially surrounding relation to the first enclosed zone, and applying a voltage to the first conductor;

arranging a first recirculator and first pump into fluid communication with the first enclosed zone and activating the first pump to continuously circulate the input fluid within the first enclosed zone for a first predetermined duration;

subjecting the first recirculator to a first magnetic field having a first polarity using one or more magnet packs attached to the first recirculator, thereby beginning a process of separating the input fluid into separate hydrogen components and other components;

configuring a second enclosed zone for receiving and circulating the input fluid;

arranging a second conductor in a circumferentially surrounding relation to the second enclosed zone, and applying a voltage to the second conductor;

arranging a second recirculator and second pump into fluid communication with the second enclosed zone;

activating the second pump to continuously circulate the input fluid within the second enclosed zone for a second predetermined duration;

subjecting the second recirculator to a second magnetic field having a second polarity using one or more magnet packs attached to the second recirculator, thereby beginning a process of separating the input fluid into separate hydrogen components and other components;

the second enclosed zone eventually forming the shelf-stable proton-rich atomic hydrogen output fluid;

supplying a predetermined amount of the proton-rich atomic hydrogen output fluid for a predetermined amount of time at a predetermined pressure into a pressure vessel within the vaporizer;

adjusting the predetermined pressure of the pressure vessel to be between 0 and 12000 PSI;

applying a predetermined voltage to the pressure vessel through two or more electrodes; and evacuating a predetermined amount of wet H2 gas from the pressure vessel at a predetermined pressure.

2. The method of claim 1, further comprising:

drying the wet H2 gas using a specially-configured dryer.

3. The method of claim 2, further comprising:

managing the evacuating step using a back pressure relief (BPR) valve.

4. The method of claim 1, further comprising:

routing the dried H2 gas through a mass gas analyzer suitable for displaying a gas purity.

5. The method of claim 4, further comprising:

viewing a display on the mass gas analyzer; and affirming a gas purity of >90% H2 by mass.

6. The method of claim 5, further comprising:

pre-configuring the proton-rich atomic hydrogen output fluid to have a potential mass in its H2 gas state to be greater than its potential mass in its liquid state.

7. The method of claim 1, further comprising:

affirming effective operation of the vaporizer by photographing the H2 gas emitted using high-speed photography; and capturing one or more still images of bubble sizes and amounts at each of a positive electrode and a negative electrode.

8. The method of claim 1, further comprising:

configuring a specialized power supply to work with the vaporizer;

the specialized power supply applying a first Overall Nucleation Voltage (ONV) to the first and second electrodes.

9. The method of claim 8, further comprising:

configuring the ONV voltage to range between a minimum of 0.02V and a maximum of 1200V.

10. The method of claim 8, further comprising:

operating the vaporizer using two electrodes where there is no insulating separator between each other and where the two electrodes exist within the single pressure chamber.

11. The method of claim 1, the reactor system further comprising:

arranging one or more of the recirculators to have fluting located therewithin;

wherein during operation, one or more of the pumps forcing the input fluid to collide with the fluting, thereby over time eventually breaking down the covalent bonds of any water remaining within the input fluid.

* * * * *